United States Patent
Marshall et al.

(10) Patent No.: US 11,567,164 B2
(45) Date of Patent: *Jan. 31, 2023

(54) INTERCEPTING AN UPLINK SIGNAL TO ASSIST IN TIMING OR POSITIONING CALCULATIONS

(71) Applicant: u-blox AG, Thalwil (CH)

(72) Inventors: Christopher Marshall, Haywards Heath (GB); Pascal Herczog, Cambridge (GB); Dusko Vujadinovic, Cambridge (GB)

(73) Assignee: U-BLOX AG, Thalwil (CH)

( * ) Notice: Subject to any disclaimer, the term of this patent is extended or adjusted under 35 U.S.C. 154(b) by 823 days.

This patent is subject to a terminal disclaimer.

(21) Appl. No.: 16/466,272

(22) PCT Filed: Dec. 1, 2016

(86) PCT No.: PCT/EP2016/079507
§ 371 (c)(1),
(2) Date: Jun. 3, 2019

(87) PCT Pub. No.: WO2018/099568
PCT Pub. Date: Jun. 7, 2018

(65) Prior Publication Data
US 2019/0324111 A1    Oct. 24, 2019

(51) Int. Cl.
*G01S 5/02*     (2010.01)
*G01S 5/00*     (2006.01)
*G01S 5/14*     (2006.01)
*H04W 64/00*    (2009.01)

(52) U.S. Cl.
CPC .......... *G01S 5/0236* (2013.01); *G01S 5/0036* (2013.01); *G01S 5/145* (2013.01); *H04W 64/003* (2013.01)

(58) Field of Classification Search
CPC ...... G01S 5/036; G01S 5/0236; G01S 5/0273; G01S 5/145; H04W 64/003
See application file for complete search history.

(56) References Cited

U.S. PATENT DOCUMENTS

| | | | |
|---|---|---|---|
| 2014/0120947 A1 | 5/2014 | Siomina | |
| 2015/0208262 A1* | 7/2015 | Siomina | H04W 24/10 370/252 |
| 2015/0215793 A1 | 7/2015 | Siomina et al. | |
| 2016/0227373 A1* | 8/2016 | Tsai | H04W 24/10 |
| 2016/0286353 A1* | 9/2016 | Barlev | G01S 5/0221 |

OTHER PUBLICATIONS

International Search Report and Written Opinion dated Aug. 25, 2017 in International Application No. PCT/EP2016/079507.

* cited by examiner

*Primary Examiner* — Cassi J Galt
(74) *Attorney, Agent, or Firm* — Finnegan, Henderson, Farabow, Garrett & Dunner LLP

(57) ABSTRACT

Methods and apparatus are disclosed for sharing assistance information relating to an uplink signal transmitted by a first User Equipment. The assistance information may be used to assist a wireless communication device to intercept the uplink signal and measure its time of arrival. The assistance information may be used to assist in the calculation of a position or time, based on the measured time of arrival.

15 Claims, 12 Drawing Sheets

INTERCEPTING AN UPLINK SIGNAL TO ASSIST IN TIMING OR POSITIONING CALCULATIONS

CLAIM FOR PRIORITY

This application is a U.S. national phase entry under 35 U.S.C. § 371 from POT International Application No. PCT/EP2016/079507, filed Dec. 1, 2016, of which this application claims priority, which is incorporated herein by reference.

FIELD OF THE INVENTION

This invention relates to the use of uplink signals for positioning or timing applications. It relates in particular to a User Equipment (UE) transmitting an uplink signal and that uplink signal being intercepted by another wireless communication device, for use in positioning or timing calculations.

BACKGROUND OF THE INVENTION

Known cellular positioning systems can be divided into two types:

In a downlink measurement system, the device (UE) makes measurements of the time of arrival of the downlink signals from the base stations (BSs), and the measurements are then processed in the device to find the position of the UE, or the measurements are passed up to a positioning engine in the network to find the position of the UE. Systems in which the device does the calculations are known as Mobile-Station-based (MS-based) systems. Those in which the measurements are forwarded to a positioning engine at a remote server are called MS-assisted systems.

A second kind of system uses uplink measurements by the network. In such uplink systems, a number of base stations (BSs) receive and measure the time of arrival of the uplink signals from the UE, and then these are processed to find the location of the UE.

It is common for a UE to be able to receive the downlink signals of multiple BSs, because the downlink signal can be transmitted with higher power. A disadvantage of downlink-measurement systems is that they require the UE to make the measurements. Uplink-measurement systems avoid the need for the UE to make measurements, but they require that the UE's uplink signal can be received by several BSs. This may not be practical in some environments, because the uplink signal is lower power and may be too weak to be received at distant BSs (that is, at BSs other than the BS that is serving the UE).

SUMMARY OF THE INVENTION

According to a first aspect of the invention, there is provided a wireless communication device comprising:

a first receiver, for intercepting a first uplink signal transmitted by a first User Equipment, hereinafter UE, in a wireless infrastructure network to a first base station, hereinafter BS, serving the first UE; and a processor, configured to:

obtain assistance information relating to the first uplink signal;

control the first receiver to intercept the first uplink signal based on the assistance information; and measure the time of arrival of the first uplink signal, the processor being further configured to perform one of the following steps:

use the measured time of arrival to assist in the calculation of a position or a time; and send the measured time of arrival to a remote server, for use in assisting a calculation of a position or a time.

"Intercept" is used here in the sense that the first uplink signal is not primarily intended to be received by the wireless communication device. The first uplink signal is primarily intended to be received by the first BS for communications purposes. Another way to describe this is that the first receiver "overhears" the first uplink signal. For the avoidance of all doubt: the first uplink signal is not prevented from reaching the first BS.

Measuring the time of arrival of the first uplink signal preferably comprises measuring the time of arrival of a detectable modulation that has been imposed on the first uplink signal. Detecting the modulation and measuring its time of arrival may comprise at least partly demodulating the first uplink signal.

The first UE may be a mobile device or a fixed device. Optionally, the first UE may be configured for Machine-to-Machine (M2M) communication. That is, the first UE may be incorporated in a device whose primary function is not personal mobile communication. In some embodiments, the first UE is a mobile device incorporated in a vehicle. The position of the first UE may be unknown (at least prior to the calculation of a position).

A position calculated according to an embodiment of the method is preferably specified in two dimensions, and optionally in three dimensions.

When calculating a position, the position may be calculated in absolute terms—for example, in geographic coordinates (typically comprising latitude, longitude, and optionally altitude). Alternatively, the position may be calculated in relative terms—for example, as a position difference from a reference location. In some cases, the position may comprise a position difference in one dimension—that is, a separation distance from a reference location.

The assistance information may comprise identity information of the first UE, parameters of the first uplink signal, or both. In some cases, the parameters of the first uplink signal may also comprise identity information of the first UE. For example, the assistance information may comprise Medium Access Control (MAC) information associated with the first UE, which may both identify the first UE and comprise parameters of the first uplink signal.

The assistance information is obtained in advance, before intercepting the first uplink signal, so that it can be used to help the first receiver to intercept the first uplink signal.

The processor may obtain the assistance information from a variety of sources. Typically, the assistance information will need to be obtained from a source external to the wireless communication device. In some embodiments, the assistance information may be obtained from the first UE. For example, the first UE may generate the assistance information and provide it to the wireless communication device via a communications network, preferably comprising a wireless communications network. Alternatively, the assistance information may be provided to the wireless communication device from the first UE via an intermediary such as a remote server or service. Again, this may be done via a communications network, preferably comprising a wireless communications network. In some embodiments, the assistance information may be provided through a remote supporting service, which gathers information about a plurality of first UEs. In other embodiments, the assistance information may be generated by and/or provided through a wireless infrastructure network. This could be the wireless infrastructure network in which the first UE is operating, particularly if the wireless communication device is a UE operating in the same wireless infrastructure network (though this is not essential). In still other embodiments, part of the assistance information is provided through a remote supporting service and the remainder is generated by and/or provided through a wireless infrastructure network.

In one embodiment, controlling the first receiver to intercept the first uplink signal based on the assistance information may comprise controlling the first receiver to search for the first uplink signal using the assistance information to guide the search.

In general, the assistance information may be obtained by the wireless communication device via either wired or wireless communication. Therefore, the wireless communication device preferably comprises a wired or wireless communication interface for receiving the assistance information. Suitable wired communication interfaces include but are not limited to a Local Area Network (LAN) interface. Suitable wireless communication interfaces include but are not limited to: a wireless LAN (WLAN) interface; and a cellular data communications interface.

The wireless communication device may be a second UE, comprising: a transmitter, for transmitting a second uplink signal to a second base station, hereinafter BS, serving the second UE; and a second receiver, for receiving a first downlink signal from the second BS.

The first receiver and the second receiver may be provided by the same physical hardware components in some embodiments. That is, it may be possible for a single receiver to receive both downlink signals and uplink signals.

This will depend to some extent on the characteristics of the wireless infrastructure network in which each UE operates.

The first UE and second UE may be served by the same BS or different BSs. That is, the first BS and second BS may be the same BS or different BSs. The first UE and second UE may be operating in the same wireless infrastructure network or may be operating in different wireless infrastructure networks.

The second UE may be a mobile device or a fixed device. Optionally, the second UE may be configured for Machine-to-Machine (M2M) communication. That is, the second UE may be incorporated in a device whose primary function is not personal mobile communication. In some embodiments, the second UE is a mobile device incorporated in a vehicle. The position of the second UE may be unknown (at least prior to the calculation of a position).

The processor may be further configured to measure the time of arrival of the first downlink signal, and to either: use the measured time of arrival of the first downlink signal to assist in the calculation of the position or the time; or send the measured time of arrival of the first downlink signal to a positioning server, for use in assisting the calculation of the position or the time.

The processor may be further configured to send identity information of the second UE to the remote server for use in assisting a calculation of a position or a time.

The assistance information may comprise at least one or any combination of two or more of: identity information of the first UE; a position of the first UE; general parameters of the first uplink signal; parameters of the first uplink signal that are specific to the first UE; general parameters of a second downlink signal transmitted by the first BS; and information that allows the wireless communication device to receive and interpret configuration information for the first UE sent by the first BS in the second downlink signal.

In some embodiments, the identity information may comprise an identity address or label, which may be either permanently or temporarily assigned to the first UE. The identity information preferably allows the first uplink signal to be associated with a specific piece of physical equipment. A Cell Radio Network Temporary Identifier (C-RNTI) is an example of identity information of the first UE. A C-RNTI is an identification number assigned by a BS temporarily to each UE currently served by it.

General parameters of the first uplink signal are those that are also used for the uplink signals of all other UEs communicating with the first BS. These may include parameters such as the cellular channel allocation, including frequency and bandwidth.

Parameters of the first uplink signal that are specific to the first UE may include identity-specific radio information, such as Medium Access Control (MAC) level information, timing information, resource blocks used for the first uplink signal, coding information for the first uplink signal, and signatures for the first uplink signal. Specific parameters of the first uplink signal may also include information about data to be transmitted by the first UE in the first uplink signal.

The specific parameters of the first uplink signal may include information derived from the configuration information for the first UE sent by the first BS in the second downlink signal.

General parameters of the second downlink signal are parameters that would be used by any UE wishing to receive the second downlink signal. For example, this may include information about the channel used for the second downlink signal.

MAC level information may comprise one or any combination of two or more of: a channel, carrier frequency, bandwidth, and/or set of OFDM sub-carriers to be used for the first uplink signal; a time of transmission of the first uplink signal; a frame timing structure and/or sub-channel allocation of the first uplink signal; an actual timing of the frame; a timing advance of the first UE; a spreading code used in the first uplink signal; a code-phase of that spreading code; a time slot to be used by the first UE for a Random Access Channel (RACH) transmission; and one or more time and frequency resource blocks to be used by the first UE for an uplink data transmission.

In some embodiments, a time of transmission of the first uplink signal may be predefined by the time slot in which the uplink signal will be transmitted, preferably compared with the system frame time. In some embodiments, the time of transmission may be predefined relative to a reference clock, a second downlink signal received by the first UE from the first BS, or another received signal. In some embodiments, the time of transmission may be predefined as a precise time with respect to a reference clock, such as the clock of a Global Navigation Satellite System (GNSS).

MAC information associated with the first UE may also comprise information about the first BS, such as one or more of: identity information of the first BS; timing information of the first BS; a System Frame Number (SFN) of the first BS; and Downlink Control Information (DCI) of the first BS.

Information about coding may comprise a code, signature, format, or RACH preamble to be used by the first UE for a RACH uplink access request.

In some cases, the assistance information may be specific information, that allows the first receiver to intercept a unique first uplink signal transmitted by a specific first UE. Such information might not assist the first receiver to intercept any other first uplink signal—including other uplink signals transmitted by other first UEs, and other uplink signals transmitted by the same first UE. This kind of assistance information may be thought of as low-level assistance information. It may comprise MAC information on frequency channel, frame time-slot, and code used. It may be provided from the first UE to the wireless communication device or the wireless communication device may request the first UE to transmit the first uplink signal with these specific MAC parameters.

In other cases, the assistance information may be generic information, pertaining to a plurality of first uplink signals and allowing the first receiver to intercept this plurality of first uplink signals. The plurality of first uplink signals may comprise uplink signals transmitted by a single first UE at different times, or uplink signals transmitted by a plurality of first UEs (at the same or different times), or a combination of both. This generic information may be thought of as high-level assistance information. It may comprise general channel configurational information, device or network scheduling information, device activity scheduling information from the first UE, or identity information (or a combination of two or more of these).

An advantage of high-level assistance information is that it does not need to be transmitted for each measurement. This may help to reduce signaling and protocol traffic. It may be particularly advantageous for (i) tracking applications, in which repeated measurements of a UE's position are desired; and (ii) multi-target applications, such as Vehicle to Vehicle communications and positioning, in which the high-level information can be provided (optionally broadcast) to multiple wireless communication devices, which can then act autonomously to intercept uplink signals and measure their times of arrival, without the need for explicit individual instructions. This may help to reduce protocol overhead and time delay, compared with instructing each wireless communication device separately.

The wireless communication device may be configured to store high-level assistance information in a memory, for subsequent reuse.

The processor of the wireless communication device may be configured to obtain the assistance information from a remote supporting service or from the first UE.

In either case, when the wireless communication device is a second UE as summarised above, the assistance information may be obtained via user plane data communication via the second BS. Alternatively, the assistance information may be provided by means of a control plane protocol via the second BS. As a further alternative, the assistance information may be provided via a separate communication path, such as a local Wi-Fi connection.

The remote supporting service may be provided by the remote server that calculates the position or time, or it may be provided by another remote server.

The assistance information obtained from the remote supporting service or first UE may comprise at least one or any combination of two or more of: a frequency resource block to be used for the first uplink signal; a time of transmission of the first uplink signal; a SFN associated with the time of transmission; identity information of the first BS; a RACH format, signature, and/or code to be used by the first UE; and a C-RNTI of the first UE.

The assistance information obtained from the remote supporting service may have originated from the first UE, or from the first BS, or from the wireless infrastructure network of which the first UE and the first BS are components.

The wireless communication device may comprise a third receiver for receiving a second downlink signal from the first BS.

In some embodiments, the third receiver may share some or all of its physical hardware components with the second receiver, since both of these receivers are configured to receive downlink signals.

The processor of the wireless communication device may be further configured to measure the time of arrival of the second downlink signal, and to either: use the measured time of arrival of the second downlink signal together with the measured time of arrival of the first uplink signal to assist in the calculation of the position or the time; or send the measured time of arrival of the second downlink signal and the measured time of arrival of the first uplink signal to the remote server, for use in assisting the calculation of the position or the time.

Time of arrival measurements of the first uplink signal together with the second downlink signal may be particularly useful in some circumstances. For example, it may allow a local clock offset of the first UE to be cancelled out in the calculation of the position or time, by forming a difference of the two time of arrival measurements.

The processor may be configured to obtain at least some of the assistance information by decoding the second downlink signal received from the first BS.

The second downlink signal is the downlink signal from the first BS to the first UE. This signal therefore contains useful configuration information defining parameters of the first uplink signal, as mentioned already above.

The assistance information obtained from the second downlink signal may comprise at least one or any combination of two or more of: DCI comprising MAC information to be used for the first uplink signal; and a sounding allocation for a sounding signal to be sent by the first UE.

The processor may be configured to: obtain a first portion of the assistance information from a remote supporting service or from the first UE; and use the first assistance information to obtain a second portion of the assistance information from the second downlink signal.

For example, the first portion of assistance information may tell the processor which part of the second downlink signal to decode or how to decode it in order to obtain the second portion of assistance information. In another example, the first portion of assistance information may comprise information about the first BS, to help the third receiver detect, receive, or decode the second downlink signal.

The first portion may comprise high-level assistance information, as summarised previously above. The second portion may comprise low-level assistance information, as also summarised previously above.

The processor may be configured to control the first receiver to intercept the first uplink signal in response to an instruction received from a source external to the wireless communication device.

In this case, the interception and measurement of the time of arrival are initiated by the external source, rather than by the wireless communication device. The instruction may include some or all of the assistance information.

The instruction may be received from a remote server or supporting service, from the first UE or some other UE, or from a wireless infrastructure network of which either the wireless communication device or the second UE (or both) are a part.

In some embodiments, the remote supporting service instructs the wireless communication device to listen for and intercept the first uplink signal from the first UE. The remote supporting service may know the timing and other parameters of the first uplink signal either because it has gathered this information from the first UE or because it has instructed the first UE to transmit the first uplink signal in a particular way. This can allow the measurement of the time of arrival to be made more efficiently and/or effectively, thanks to improved coordination and control of the transmission and/or reception of the first uplink signal. The same is true if the instruction comes from the first UE itself.

The wireless communication device may be configured to send a request to the first UE or to a remote supporting service, to cause the first UE to transmit the first uplink signal to the first BS.

In this case the interception and measurement of the time of arrival are initiated by the wireless communication device. The wireless communication device requests the sending of the first uplink signal in order that the wireless communication device can intercept it and measure its time of arrival.

In this example, the processor of the wireless communication device may be able to measure the time of arrival of the first uplink signal more efficiently or effectively because the wireless communication device caused it to be transmitted and can therefore predict the timing or other parameters of the first uplink signal more accurately. The request may be sent by the wireless communication device to the first UE via any suitable communication network. Alternatively, the request may be sent via any suitable communication network the remote supporting service, which may then act as an intermediary between the wireless communication device and the first UE.

Optionally, the request to the first UE may comprise timing and/or other parameters of the first uplink signal to be transmitted.

The processor may be further configured to, after the first uplink signal has been intercepted: obtain timing information describing the time of transmission of the first uplink signal by the first UE; and perform one of the following steps: use the obtained timing information to assist in the calculation of the position or time; and send the obtained timing information to the remote server, for use in assisting the calculation of the position or time.

This can allow the wireless communication device to obtain precise timing information for the calculation of position or time, which is particularly useful if it is not possible for the time of transmission of the first uplink signal to be predefined precisely in advance.

The first receiver and the second receiver are optionally provided by a common receiver and the processor may be configured to control the common receiver to disconnect from the first downlink signal before intercepting the first uplink signal.

Alternatively or in addition, the first receiver and the third receiver may be provided by a common receiver and the processor may be configured to control this common receiver to disconnect from the first downlink signal before receiving the second downlink signal.

The wireless communication device may further comprise a GNSS receiver, wherein the processor is further configured to send GNSS positioning data from the GNSS receiver to the remote server.

According to a second aspect of the invention, there is provided a first UE for use in a wireless infrastructure network, the first UE comprising:

a transmitter, configured to transmit an uplink signal to a BS serving the first UE in the wireless infrastructure network;

a first receiver, configured to receive a downlink signal from the BS; and a processor, configured to share assistance information, relating to the first UE and/or the uplink signal, with a wireless communication device before the uplink signal is transmitted to assist the wireless communication device to intercept the uplink signal.

The wireless communication device may be a wireless communication device as summarised previously above. The assistance information may be shared with the wireless communication device via any suitable communications network (preferably comprising a wireless communications network, such as a WLAN). In some embodiments, the assistance information is shared by the first UE via the wireless infrastructure network—for example, encoded in the uplink signal, preferably as user plane data communication—but this is not essential. The assistance information that is shared may be of the same kind as the assistance information obtained and used by the wireless communication device summarised above. In some embodiments, the assistance information may be shared with the wireless communication device via an intermediary such as a remote supporting service.

In some embodiments, the processor is configured to share the assistance information with a plurality of wireless communication devices. This can help each of these devices to intercept the uplink signal, permitting multiple measurements of its time of arrival to be made.

Optionally, the processor may be configured to share the assistance information with a wireless communication device that is a UE in a different wireless infrastructure network to the first UE. This can allow uplink signals to be measured between UEs that are not members of the same wireless infrastructure network. This can considerably increase the number of measurements that can be made and therefore improve the richness of information available for calculating positions and/or times.

The assistance information shared may comprise at least one or any combination of two or more of: a frequency resource block to be used for the uplink signal, a time of transmission of the uplink signal; a SFN associated with the time of transmission; identity information of the BS; signal format information for a message to be transmitted by the first UE (such as a RACH message); and identity information of the first UE, such as a C-RNTI.

The first UE may be configured to transmit the uplink signal in response to a received request.

Preferably, the first UE is configured to share the assistance information in response to the same received request.

The request may be received from a remote server or support service, from the first UE, from another UE, or from the wireless infrastructure network.

Optionally, the received request may comprise timing and/or other parameters of the uplink signal to be transmitted. For example, the RACH format may be instructed, and/or the time of transmission may be scheduled or accurately set as a result of input from the requesting entity. This is an alternative to the first UE choosing these parameters itself and then reporting them to the wireless communication device. This may, for example, facilitate efficient scheduling, may help to reduce power consumption of the receiver in the wireless communication device, and may avoid the need to post-report the accurate time of transmission, if this is predefined in advance.

The processor of the first UE may be further configured to send timing information to the wireless communication device or to a remote server after the uplink signal has been transmitted, the timing information describing the time at which the uplink signal was transmitted by the first UE.

This additional step may be useful if it is not possible to specify in advance an exact predefined time of transmission for the uplink signal. Preferably, this timing information describes the time of transmission precisely, with respect to a known timing reference. The known timing reference may include but is not limited to one of the following: a clock of a GNSS system; a time of receipt by the first UE of a signal from the first BS; and a time of receipt of an overheard signal from a second UE. Knowing a precise time of transmission can assist the wireless communication device or the remote server in the calculation of a position or time.

The timing information may further comprise a timing advance of the first UE, as set by the BS serving the first UE.

The first UE may further comprise a GNSS receiver, wherein the processor is further configured to send GNSS positioning data from the GNSS receiver to the wireless communication device or a remote server.

Knowing the position of the second UE can assist the first UE or the remote server to calculate position or time.

According to a third aspect of the invention, there is provided a server for centralised positioning and/or timing calculations, comprising:
 a memory; and
 a processor, the processor being configured to:
  receive from a plurality of wireless communication devices the times of arrival of uplink signals transmitted by a plurality of first UEs to their serving Base Stations and intercepted by the wireless communication devices;
  receive assistance information relating to the uplink signals; and
  use the times of arrival and the assistance information to calculate a position of one or more of the first UEs or wireless communication devices or a time at one or more of the first UEs or wireless communication devices.

Some of the wireless communication devices may also be first UEs. That is, the plurality of wireless communication devices may overlap with the plurality of first UEs.

The assistance information may comprise any of the types of assistance information summarised above. The server uses the assistance information to help calculate the position or the time. Note that the wireless communication devices may use the same assistance information or different assistance information to help them intercept the uplink signals transmitted by the first UEs.

Particularly preferred assistance information for calculating a position or time may comprise at least one or any combination of two or more of: identity information of one or more of the first UEs; a time of transmission of one or more of the uplink signals by the respective first UEs; a position of one or more of the first UEs; and position and/or timing information relating to the respective base stations serving one or more of the first UEs.

The time of transmission of the one or more uplink signals may be described by the time slot in which the uplink signal was transmitted, preferably compared with the system frame time. In some embodiments, the time of transmission may be described relative to a reference clock, the downlink signal received by the second UE from its serving BS, or another received signal. In some embodiments, the time of transmission may be described as a precise time with respect to a known timing reference. The known timing reference may include but is not limited to one of the following: a clock of a GNSS system; a time of receipt by the first UE of a signal from the first BS; and a time of receipt of an overheard signal from a second UE.

The processor of the server may be configured to obtain the time of transmission of the one or more uplink signals from reports sent by the respective first UEs.

According to a fourth aspect of the invention, there is provided a server computer for providing a supporting service for timing measurements, the server computer comprising:
 a memory; and
 a processor, configured to:
  obtain assistance information relating to uplink signals to be transmitted by a plurality of first UEs; and
  provide the assistance information to a plurality of wireless communication devices, to assist the wireless communication devices to intercept the uplink signals so that the wireless communication devices can measure times of arrival of the uplink signals for use in the calculation of a position or a time.

The assistance information may be of the same kind summarised already above.

Optionally, the plurality of first UEs may comprise UEs in different wireless infrastructure networks.

The processor of the server computer may be further configured to instruct each first UE to transmit its uplink signal at a predefined time of transmission and/or with other predetermined parameters.

The parameters of the uplink signal may be the same as those summarised previously above.

The processor of the server computer may be further configured to instruct each wireless communication device to intercept the uplink signals and measure their times of arrival.

In some embodiments, the server computer providing the supporting service may be the same computer as the server for centralised positioning and/or timing calculations and may implement both functions. In other embodiments, these will be separate computers.

In some embodiments, the assistance information may be broadcast to the plurality of wireless communication devices in a single transmission. This can avoid the protocol overhead associated with individual messages sent separately to each wireless communication device.

According to a fifth aspect of the invention, there is provided a method of gathering a measurement for assisting the calculation of a position or a time, the method comprising:
 obtaining assistance information relating to a first uplink signal to be transmitted by a first UE in a wireless infrastructure network to a first BS serving the first UE;
 intercepting the first uplink signal at a first wireless communication device, wherein the intercepting is assisted by the assistance information;
 measuring the time of arrival of the first uplink signal at the first wireless communication device; and
 storing the measured time of arrival for use in assisting the calculation of at least one of: a position of the first UE, a position of the first wireless communication device, a time at the first UE, and a time at the first wireless communication device.

The method preferably further comprises using the stored time of arrival assist in the calculation of at least one of: a position of the first UE, a position of the first wireless communication device, a time at the first UE, and a time at the first wireless communication device.

The method may further comprise: intercepting the first uplink signal at a second wireless communication device, assisted by the assistance information; measuring the time of arrival of the first uplink signal at the second wireless communication device; and storing the measured time of arrival for use in assisting the calculation of at least one of: a position of the first UE, or the first or second wireless communication devices, and a time at the first UE, or the first or second wireless communication devices.

This approach may be advantageous in that it can allow a time difference of arrival at the first wireless communication device and the second wireless communication device to be calculated. Using a time difference of arrival may in some cases be more accurate and/or may allow the desired position or time to be calculated with less information about the first UE. For example, the time difference of arrival is independent of the transmission time of the first uplink signal by the first UE. Therefore, the precise transmission time does not need to be known. Potential uncertainties or tolerances in the time of transmission will therefore not affect the calculation.

Preferably, the first wireless communication device and the second wireless communication device are located at different altitudes, and the method comprises calculating an altitude of the first UE. Alternatively, the first wireless communication device and the first UE may be located at different altitudes, and the method may comprise calculating an altitude of the second wireless communication device. Diversity in the altitude of the devices may be particularly advantageous because it can allow the altitude of another device to be calculated with greater precision. Determining the altitude of a device accurately by other means may be difficult. For example, downlink signals from base stations may be useful to calculate a horizontal position, but it may be difficult to calculate a vertical position (altitude) from such signals if the base stations are all mounted at approximately the same height (as is common).

The first wireless communication device may be a second UE, the method optionally further comprising: intercepting, at the first UE, a second uplink signal transmitted by the second UE to a second BS serving the second UE; measuring the time of arrival of the second uplink signal at the first UE; and storing the measured time of arrival at the first UE of the second uplink signal, for use in assisting the calculation of the position or time.

The method preferably further comprises using the time of arrival of the first uplink signal at the second UE and the time of arrival of the second uplink signal at the first UE to assist in the calculation of at least one of: a position of the first UE, a position of the second UE, a time at the first UE, and a time at the second UE. In general, it may be desirable to obtain assistance information comprising the times of transmission of the first and second uplink signals, for use in the calculation.

Preferably, the second uplink signal is transmitted by the second UE in response to receipt of the first uplink signal. More preferably, the second UE transmits the second uplink signal with a predetermined delay after the time of arrival of the first uplink signal. This can allow a "round-trip" time to the first UE to be calculated, which can in turn allow a separation between the two devices to be determined. In this case, the separation may be determined without needing to know the absolute times of transmission of the first and second uplink signals. This can help to minimize inaccuracies in the calculation caused by inaccuracies in the times of transmission.

The method may comprise: obtaining information about a plurality of first UEs whose first uplink signals could be intercepted by the first wireless communication device; using the information to select a subset of the first UEs; intercepting, at the first wireless communication device, the first uplink signals from the first UEs in the selected subset; measuring the times of arrival of these first uplink signals at the first wireless communication device; and using these measured times of arrival to assist in the calculation of at least one of: a position of the first wireless communication device, a position of one of the first UEs in the selected subset, a time at the first wireless communication device, and a time at one of the first UEs in the selected subset.

The method may comprise: intercepting, at the first wireless communication device, first uplink signals from a plurality of first UEs; measuring the times of arrival of these first uplink signals at the first wireless communication device; obtaining information about the plurality of first UEs whose uplink signals have been intercepted; using the information to select a subset of the first UEs; using the measured times of arrival of the first uplink signals of the selected subset of the first UEs to assist in the calculation of at least one of: a position of the first wireless communication device, a position of one of the first UEs in the selected subset, a time at the first wireless communication device, and a time at one of the first UEs in the selected subset.

The information used to select the subset may comprise at least one or any combination of two or more of: location information for some or all of the first UEs; motion information for some or all of the first UEs; identity information of each of the first UEs; for each of the first UEs, a time of transmission of its respective first uplink signal; for each of the first UEs, a frequency at which it transmits its respective first uplink signal; and network information for each of the first UEs, preferably identifying the wireless infrastructure network to which each UE belongs and the BS serving each UE.

The subset of the first UEs may be selected by at least one of: selecting first UEs whose locations are known; selecting first UEs whose locations are distributed in at least two orthogonal dimensions; selecting first UEs whose locations are distributed in altitude; selecting first UEs which are stationary; selecting the first UEs whose speed is lowest; selecting the first UEs whose uplink signals are intercepted with the highest signal-to-noise ratio by the second UE; and selecting the first UEs for which the time of arrival of the uplink signal can be measured most accurately.

Selecting UEs whose locations are known is useful because it can allow the absolute position of the second UE to be established.

Selecting UEs whose locations are distributed in at least two orthogonal dimensions can increase geometrical diversity, to facilitate trilateration.

Altitude may be defined in terms of absolute elevation (coordinate WGS84), in relative terms (for example, height above ground level), or in logical terms, (for example, floor number in a building or level number in a multi-storey car park).

Preferably, the subset of first UEs includes UEs distributed in the vertical dimension. This can help to determine the position of the second UE in the vertical dimension. This can provide important position information that is difficult to obtain by other means. Commonly, base stations are well distributed horizontally, but are located at a similar height/altitude, so they give poor vertical information. A UE could be deliberately placed in a known location at a different height from the base stations, to act as an "anchor"—sharing assistance information and transmitting an uplink signal, for measurement by other UEs in the vicinity. These other UEs could conceivably be members of multiple different wireless infrastructure networks. Particularly in industrial applications, where the positioning facility is provided for a site or building, this makes deployment cost-effective (rather than needing a building-owner to arrange the installation of a separate anchor UE for each wireless infrastructure network operator used by a UE in the building). This can provide versatility, flexibility, and future-proofing (for example, allowing changes of network operator).

To select first UEs for which the time of arrival of the uplink signal can be measured most accurately, the method may comprise analysing the shape of a correlation peak to detect multipath conditions, or detecting multipath conditions in some other way. Alternatively or in addition, the method may comprise determining the base station timing drift, and selecting UEs that are associated with the BSs having the least timing drift. This may be useful because drift in the base station timing also introduces uncertainty in the knowledge of the time of transmission the uplink signal, relative to UTC or any other base station.

Selecting the subset of the first UEs may comprise selecting first UEs whose locations are distributed in altitude, and wherein the method optionally comprises calculating an altitude of the first wireless communication device.

Also provided is a non-transitory computer-readable medium comprising a computer program comprising computer program code adapted to control one or more physical computing devices to execute all of the steps of a method as summarised above, when said program is run on the one or more physical computing devices.

The one or more physical computing devices may include processors of one or more UEs and processors of one or more server computers.

In a wireless communication device, first UE, server, server computer, method, or non-transitory computer-readable medium summarise above, the or each first UE is preferably a UE in a wireless infrastructure network, said wireless infrastructure network preferably being a cellular network.

Embodiments of the invention may be used to particular advantage in the context of cellular networks because in these networks it may be particularly difficult to intercept the uplink signal transmitted by a first UE and to use it for positioning or timing calculations, in the absence of assistance information. That is, the sharing, gathering, and use of assistance information may be particularly in relation to UEs in cellular networks.

Note that where multiple UEs are involved, these may be UEs in the same cellular network or in different cellular networks.

BRIEF DESCRIPTION OF THE DRAWINGS

The invention will now be described by way of example with reference to the accompanying drawings, in which.

DETAILED DESCRIPTION

As used herein, a "wireless infrastructure network" is defined as a wireless network that is organised in a hierarchical manner, comprising one or more UEs, wherein each UE communicates with and is served by a BS. The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed.

A cellular network is one important example of a wireless infrastructure network. But many other types of Wireless Wide Area Network (WWAN) are also organised in this way. Examples include: Random Phase Multiple Access (RPMA), LoRaWAN, and sigfox.

In the following description, for simplicity and clarity, it will be assumed that the wireless infrastructure network in which each UE operates is a cellular network. This is indeed a preferred embodiment but it is just one example of a wireless infrastructure network. It will be understood that the scope of the invention is not limited to cellular networks.

Figure 1:
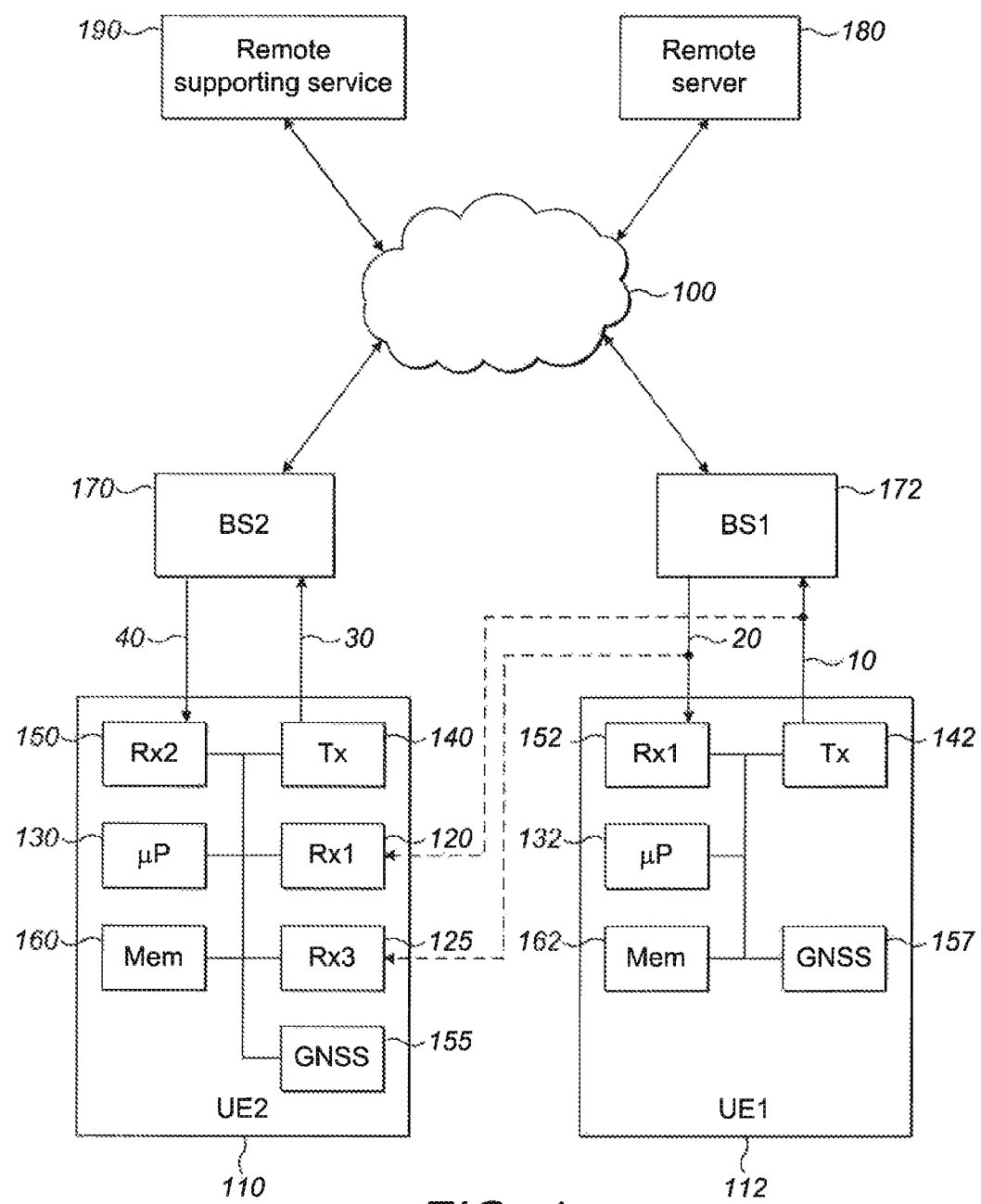
FIG. 1 is a block diagram of a system operating according to an embodiment of the invention.

FIG. 1 is a block diagram of a system operating according to an embodiment of the invention. The system includes a first user equipment (UE) 112, served by a first base station (BS) 172. A first wireless communication device 110 is configured to intercept an uplink signal 10 transmitted by the first UE 112 to the first BS 172. In this embodiment, the first wireless communication device 110 is a second UE. (However, this is by no means essential.) In the following, for simplicity but without loss of generality, we will refer to the wireless communication device as a second UE 110. The second UE 110 is served by a second BS 170.

The system also includes a remote server 180 configured to calculate a position and/or time. It further includes a remote supporting service 190 configured to provide a supporting service for timing measurements by the second UE 110 and optionally other wireless communication devices. Note that, although shown separately, the remote server 180 and the remote supporting service 190 may be provided by the same server computer.

The remote server 180; the remote supporting service 190; and the two base stations 170, 172 are coupled to a network 100. In different embodiments, this may be a public or private, wired or wireless network, or a combination of different networks of different types. For example, the network 100 may comprise parts of the infrastructure of one or more cellular networks and/or may comprise part of the internet. The first UE 112 and the second UE 110 are communicatively coupled to the remote server 180 and the remote supporting service 190 via the respective base stations 172, 170 and the network 100. For example, the first UE 112 may communicate with the remote supporting service 190 and remote server 180 using user plane data transmitted via a cellular data connection with the first base station 172 and via the network 100. The first and second UEs may also be able to communicate with one another in the same way.

In some circumstances it may be advantageous if the first and second BSs 172, 170 are part of the same cellular network, but this is not necessary in general. Optionally, the remote server 180 and/or remote supporting service 190 may also be part of the same cellular network.

The first UE 112 will now be described in greater detail. The first UE comprises a transmitter 142 that is configured to transmit a first uplink signal 10 to the BS 172. It also comprises a first receiver 152 configured to receive a second downlink signal 20 from the BS 172. A processor 132 in the first UE 112 may be configured to share assistance information with the second UE 110, before the first UE 112 transmits the first uplink signal 10, in order to help the second UE 110 to intercept the first uplink signal.

The first UE 112 may transmit the first uplink signal 10 at a time and with uplink signal parameters negotiated between the first UE 112 and the BS 172. Alternatively or in addition, the timing or other parameters of the first uplink signal may be influenced by one or more of: the remote supporting service 190; and the second UE 110. In some embodiments, the first UE 112 may receive a request to transmit the first uplink signal and may transmit the first uplink signal in response to that request.

The processor 132 may be further configured so that, after the first UE 112 has transmitted the first uplink signal, the processor reports timing information describing the time of transmission of the uplink signal. The report may be sent to one or both of the remote server 180 and the second UE 110. The reported time of transmission may be useful in position or timing calculations using methods according to embodiments of the invention.

The first UE 112 also comprises a GNSS receiver 157 and a memory 162. The processor 132 may be configured to obtain GNSS positioning data from the GNSS receiver and either store it in the memory 162 or send it to the second UE 110 or the remote server 180. When satellite signals are available, the positioning data obtained in this way may be useful for calculating the position or time at other devices, using methods according to embodiments of the invention.

The first wireless communication device (second UE) 110 will now be described in greater detail. It comprises a first receiver 120 configured to intercept the first uplink signal 10 transmitted by the first UE 112. A processor 130 of the second UE 110 is configured to obtain assistance information to help the first receiver 122 intercept the first uplink signal. The assistance information may be obtained from the remote supporting service 190; from the first UE 112; or from another source.

Having obtained the assistance information, the processor 130 controls the first receiver 122 to intercept the first uplink signal, using the assistance information. The processor 130 measures the time of arrival of the first uplink signal 10 at the first receiver 120. This time of arrival may be used in a method of calculating a position or time according to embodiments of the invention. This calculation may be performed by the processor 130 or by the remote server 180. In the latter case, the processor 130 may store the time of arrival temporarily in a memory 160 of the second UE 110, before sending the time of arrival to the remote server 180.

The second UE 110 further comprises: a transmitter 140, for transmitting a second uplink signal 30 to the second BS 170; and a second receiver 150, for receiving a first downlink signal 40 from the second BS 170. The processor 130 may be further configured to measure the time of arrival of the first downlink signal 40 at the second receiver 150. This time of arrival may also be useful for calculating a position or time using methods according to embodiments of the invention.

The second UE 110 further comprises a third receiver 125 configured to receive the second downlink signal 20 transmitted by the first BS 172. At least some of the assistance information for intercepting the first uplink signal may be obtained from the second downlink signal 20. The processor 130 may be configured to measure the time of arrival of the second downlink signal. Once again, this may be useful for calculating a position or time in methods according to embodiments of the invention.

The processor 130 may be configured to control the first receiver 120 to intercept the first uplink signal 10 in response to an instruction received from outside the second UE 110. For example, the instruction may be generated and sent by the first UE 112 or the remote supporting service 190. This may be appropriate if the processor 130 would not otherwise be aware of when to try to intercept the first uplink signal.

On the other hand, the processor 130 may be configured to send a request to cause the first UE 112 to transmit the first uplink signal. The request may be sent to the first UE 112 or to the remote supporting service 190. In some cases, the request may be more detailed in that it may include requested parameters of the first uplink signal. The more the second UE 110 can dictate the timing, form, and/or content of the first uplink signal, the less assistance information it may require to intercept it successfully. In general, there may be a variety of ways to negotiate the parameters of the first uplink signal, involving any of: the first UE 112, the second UE 110, and the remote supporting service 190.

In this embodiment, the second UE 110 also includes a GNSS receiver 155. The processor 130 is configured to send positioning data from the GNSS receiver 155 to the remote server 180, where it may be useful for calculating a position or time in methods according to embodiments of the invention.

As mentioned already above, the positioning or timing calculation may be carried out by the second UE 110 or by the remote server 180. If it is to be carried out by the second UE 110 then, after the first uplink signal has been intercepted, the processor 130 may obtain timing information describing the time of transmission of the first uplink signal. This timing information may be useful in the positioning or timing calculation.

Similarly, if the calculation is to be carried out by the remote server 180, then the remote server may obtain the same timing information, after the first uplink signal has been transmitted by the first UE 112.

Figure 2:
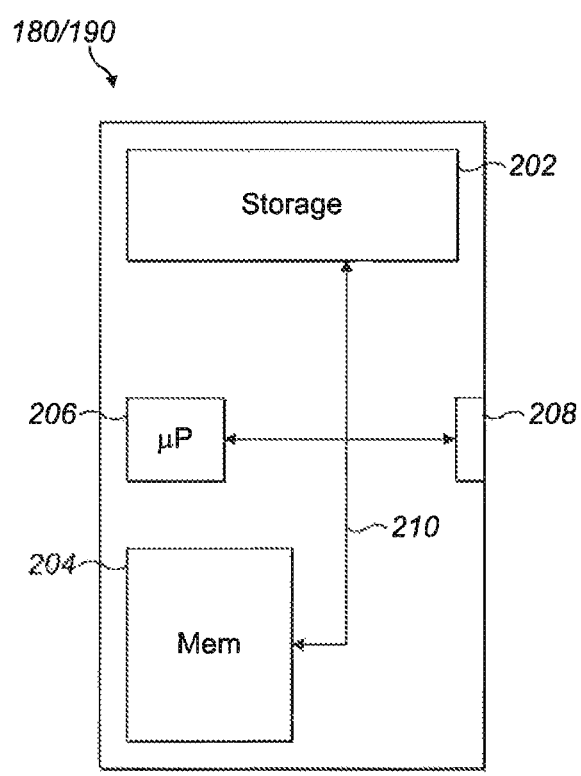
FIG. 2 is a block diagram of a server computer configured to execute a method according to an embodiment.

FIG. 2 is a block diagram of an exemplary server computer according to an embodiment. This may implement the functions of the remote server 180 or the remote supporting service 190. For simplicity, it will be assumed below that both the remote server 180 and the remote supporting service 190 are implemented by the same server computer. Of course, this is not essential and the scope of the invention is not limited in this way.

The exemplary server 180/190 comprises a computer-readable storage medium 202, a memory 204, a processor 206 and one or more interfaces 208, which are all linked together over one or more communication busses 210. The exemplary server 180/190 may take the form of a conventional computer system, such as, for example, a desktop computer, a personal computer, a laptop, a server, a mainframe computer, and so on.

The computer-readable storage medium 202 and/or the memory 204 may store one or more computer programs (or software or code) and/or data. The computer programs stored in the computer-readable storage medium 202 may include an operating system for the processor 206 to execute in order for the server 180/190 to function. The computer programs stored in the computer-readable storage medium 202 and/or the memory 204 may include computer programs according to embodiments of the invention or computer programs that, when executed by the processor 206, cause the processor 206 to carry out a method according to an embodiment of the invention The processor 206 may be any data processing unit suitable for executing one or more computer readable program instructions, such as those belonging to computer programs stored in the computer-readable storage medium 202 and/or the memory 204. As part of the execution of one or more computer-readable program instructions, the processor 206 may store data to and/or read data from the computer-readable storage medium 202 and/or the memory 204. The processor 206 may comprise a single data processing unit or multiple data processing units operating in parallel or in cooperation with each other.

The one or more interfaces 208 may comprise a network interface enabling the server 180/190 to communicate with the first and second BSs 172, 170 across the network 100. The network may be any kind of network suitable for transmitting or communicating data from one computer system to another. For example, the network could comprise one or more of a local area network, a wide area network, a metropolitan area network, the internet, a wireless communications network, and so on. The server 180/190 may communicate with other computer systems over the network via any suitable communication mechanism/protocol. The processor 206 may communicate with the network interface via the one or more communication busses 210 to cause the network interface to send data and/or commands to another computer system over the network 100. Similarly, the one or more communication busses 210 enable the processor 206 to operate on data and/or commands received by the server 180/190 via the network interface from other computer systems over the network.

It will be appreciated that the architecture of the server 180/190 illustrated in FIG. 2 and described above is merely exemplary and that systems having different architectures using alternative components or using more components (or fewer) may be used instead.

In order to perform the functions of the remote server 180, the processor 206 is configured to receive from a plurality of second UEs 110 the times of arrival of uplink signals transmitted by a plurality of first UEs 112 to their serving Base Stations 172 and intercepted by the second UEs 110. The processor 206 is further configured to receive assistance information relating to the uplink signals; and to use the times of arrival and the assistance information to calculate a position of one or more of the UEs 110, 112 or a time at one or more of the UEs 110, 112.

In order to perform the functions of the remote supporting service 190, the processor is configured obtain assistance information relating to uplink signals to be transmitted by a plurality of first UEs 112; and provide the assistance information to a plurality of second UEs 110, to assist the second UEs 110 to intercept the uplink signals so that they can measure times of arrival of the uplink signals for use in the calculation of a position or a time.

Note that, in general, some of the first UEs may be second UEs and vice versa. That is, they may both transmit uplink signals for interception by other devices and may intercept uplink signals transmitted by other devices. Likewise, they may be both donors and recipients of assistance information.

The processor 206 may be configured to instruct each first UE 112 to transmit its uplink signal. Similarly, the processor 206 may be configured to instruct each second UE 110 to intercept the uplink signals and measure their times of arrival. Thus, the processor 206 of the remote server 180 or a remote supporting service 90 may coordinate the distributed execution of methods according to embodiments of the invention.

Figure 3:
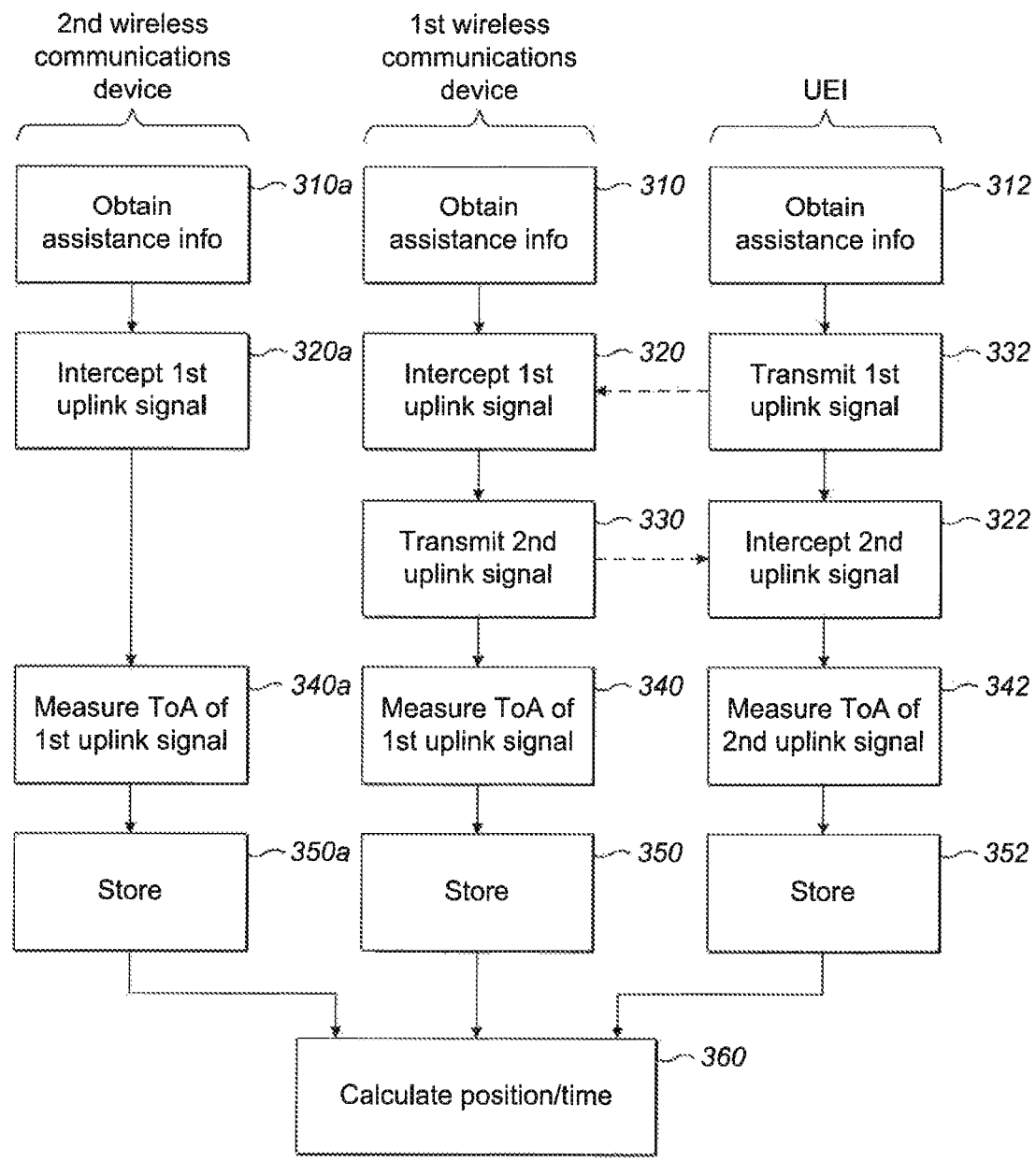
FIG. 3 is a flowchart illustrating a method of gathering a measurement for assisting the calculation of a position or time according to an embodiment.

FIG. 3 illustrates a method of gathering a measurement for assisting the calculation of a position or time according to an embodiment. The method comprises a first sequence of steps to be performed at the first wireless communications device (second UE) 110. In step 310, the second UE 110 obtains assistance information relating to a first uplink signal 10 to be transmitted by the first UE 112. In step 320, the second UE 110 uses the assistance information to intercept the first uplink signal 10. In step 340, the second UE 110 measures the time of arrival (ToA) of the first uplink signal. And, in step 350, the second UE 110 stores the measured ToA for use in calculating a position or time. The stored ToA is used to calculate the position or time in step 360.

Optionally, in step 330, the second UE 110 transmits a second uplink signal, which may be intercepted by the first UE 112. Preferably this transmission is in response to the interception of the first uplink signal transmitted by the first UE 112.

The method preferably comprises a second sequence of steps to be performed at a second wireless communication device (which may or may not also be a UE). These steps 310a, 320a, 340a, and 350a are substantially the same as the steps 310, 320, 340, and 350 performed by the second UE 110, as described above. Thus, the second wireless communication device makes a further time of arrival measurement of the first uplink signal. Having multiple independent time of arrival measurements of the same uplink signal, from devices which are—in general—located in different positions, may be advantageous to support the calculation in step 360.

The method preferably comprises a third sequence of steps to be performed at the first UE 112. In step 312, the first UE 112 obtains assistance information relating to the second uplink signal 30 to be transmitted by the second UE 110. In step 332, the first UE 112 transmits the first uplink signal 10. In step 322, the first UE 112 uses the assistance information obtained in step 312 to intercept the second uplink signal 30 transmitted by the second UE 110. In step 342, the first UE 112 measures the ToA of the second uplink signal. In step 352, this ToA is stored. It can be used, together with the other ToAs, in the calculation of step 360.

Figure 4:
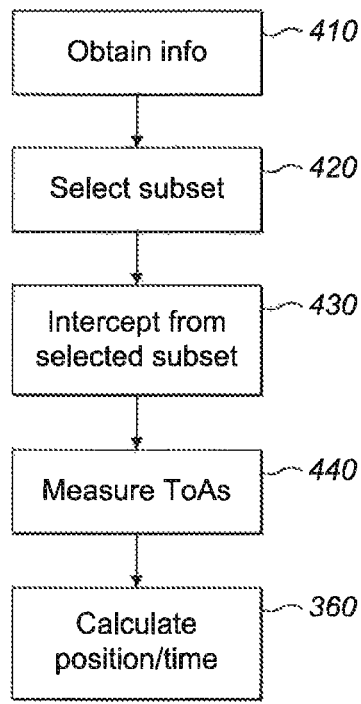
FIG. 4 is a flowchart illustrating an optional extension to the method of FIG. 3.

An optional refinement to the method of FIG. 3 is illustrated in FIG. 4. In step 410, the second UE 110 obtains information about a plurality of first UEs 112 whose first uplink signals it might wish to intercept. In step 420, the second UE 110 uses this information to select a subset of the first UEs 112 which may provide the best basis for the positioning or timing calculation. In step 430, the second UE 110 intercepts only those first uplink signals that were transmitted by UEs in the selected subset. This can avoid the unnecessary effort of intercepting less useful first uplink signals. In step 440, the second UE 110 measures the ToA of each of the selected first uplink signals. These ToAs are then used in the calculation in step 360.

Figure 5:
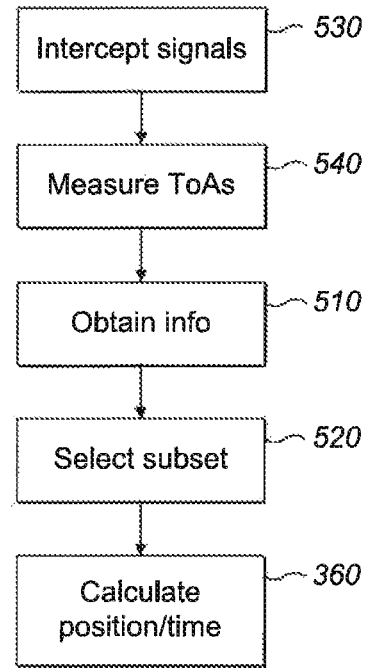
FIG. 5 is a flowchart illustrating an alternative optional extension to the method of FIG. 3.

An alternative version of this refinement is illustrated in FIG. 5. In step 530, the second UE 110 intercepts all available first uplink signals. In step 540, the second UE 110 measures the respective ToA of each first uplink signal. Then, in step 510, the second UE 110 obtains information about only those first UEs 112 whose uplink signals it has intercepted. This can avoid the unnecessary effort of obtaining information about other first UEs 112. In step 520, the second UE 110, uses the obtained information to select a subset of the first UEs. The ToAs of this selected subset and then used in the calculation in step 360.

As mentioned previously above, it is not essential that the first wireless communication device is a UE. The only requirement is that it is capable of intercepting the first uplink signal of the first UE 112. If it is not a UE, it may be preferable that the first wireless communication device has some other communications interface for enabling communication with the first UE 112; the remote server 180; and/or the remote supporting service 190. For example, the first wireless communication device may comprise a network interface such as a WLAN interface.

In the following, a number of examples of embodiments of the invention will be described in greater detail. For the avoidance of confusion, it should be noted that a UE may also be referred to as a modem.

Figure 6:
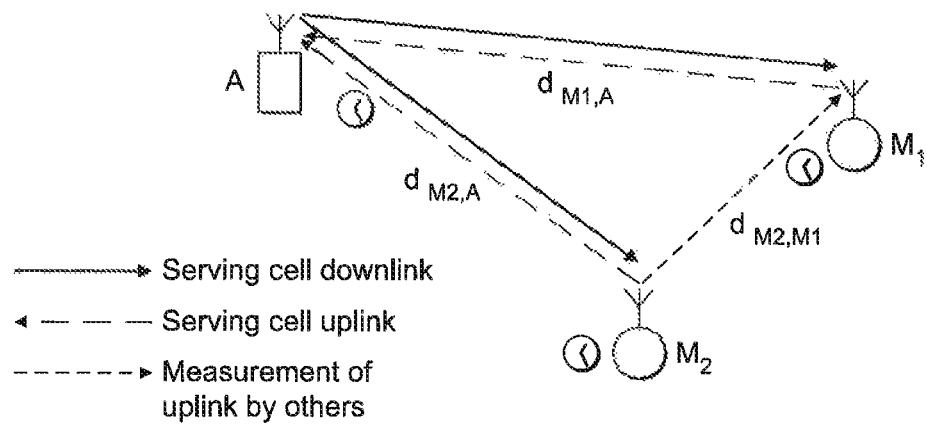
FIG. 6 illustrates time of arrival measurement of the uplink transmissions of neighbouring modems.

According to embodiments of the present invention a modem listens for, receives, and measure the time of arrival of the uplink signal from a neighbour modem. This importantly gives timing measurements related to the distances between modems, as illustrated in FIG. 6. In this diagram, the distance between two devices x and y is denoted $d_{xy}$. The downlink signal from the serving cell BS is denoted by solid arrows. The serving cell uplink signals are denoted by large dashed arrows. The interception of an uplink signal by another modem is indicated by the small dashed arrow. In this example, the listening modem $M_1$ receives and measures the time of arrival of the uplink signal transmitted to the base station by the neighbouring donor modem $M_2$, giving a measurable that depends on the separation of the two modems.

The principle of measuring distance between devices for positioning is powerful for collaborative/cooperative positioning of a number of devices in a locality. It is particularly suitable for difficult areas, where the position of a fraction of the devices is known in advance (in the case of fixed devices) or can be estimated (for example by GNSS).

The use of neighbours' uplink signal positioning in cellular systems gives particular benefits. It allows the use of existing signals, with no need for additional band allocations or approvals, or investments in infrastructure. Although not originally designed for positioning purposes, some signals are reasonably suitable for measuring time of arrival, often being strong in power (as the source is nearby) and fairly wide in bandwidth (supporting high bit rate connectivity) and having good correlation properties (designed for multiple access systems, or for channel estimation).

However there are also challenges. The uplink is often on a different frequency to the downlink, requiring a more capable receiver able to receive also the uplink signal channel. Additional processing may be required in the receiver, to decode the uplink signal, and extract synchronisation and identity information. The measurement of the time of arrival of the uplink signal may be challenging. Knowledge about the time of transmission of the uplink signal by the neighbour device may be necessary or advantageous. The system may need to support sharing or combining of information in a positioning engine to estimate the unknown location and timings of the devices involved.

Positioning based on intercepting uplink signals is beneficial in a variety of applications for cellular systems. The following examples illustrate different aspects of its use. Note that in FIGS. 7-10, discussed below, the flow of assistance information is not shown in the drawings, for reasons of clarity.

Figure 7:
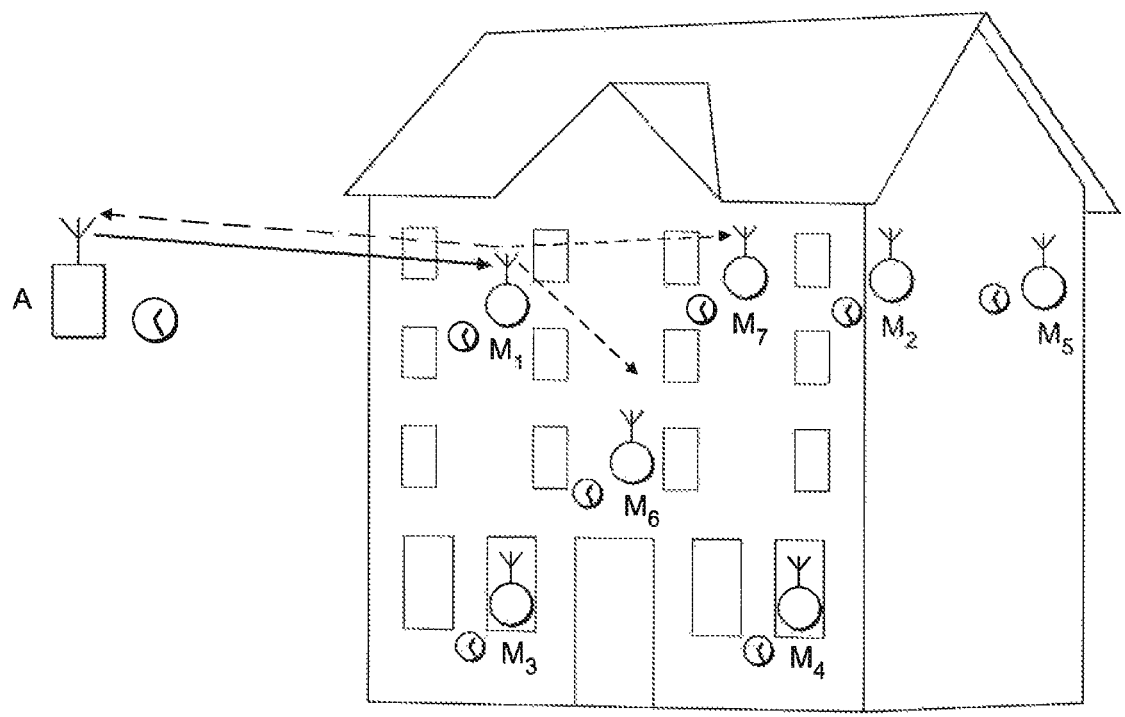
FIG. 7 illustrates neighbour uplink positioning of assets in a building.

FIG. 7 shows an example of using neighbour uplink positioning to determine the position of assets in a building. In this application, some modems ($M_1$ to $M_5$) act as references, fixed in known locations around the building, acting as anchors (listening modems) or beacons (transmitting donor modems). The locations of the mobile devices ($M_6$ and $M_7$) are then estimated, from the measurements of the time of the arrival of the uplink signals sent by the neighbour donors to the distant base station (A). Because the reference modems are nearby, there are plentiful, good signals available from all around to allow ranging measurements and trilateration positioning. This is despite the users being indoors, and even if there is limited coverage by the base stations—even in the extreme case where there is only one network operator and only one base station visible.

Furthermore, the placing of the reference modems at the top and bottom of the building allow vertical positioning, to establish which floor the mobile assets are on. This can be difficult with conventional cellular positioning techniques using base station measurements, as base stations are often distributed roughly at the same roof-top altitude, making vertical measurements subject to large geometrical errors, or impossible.

Figure 8:
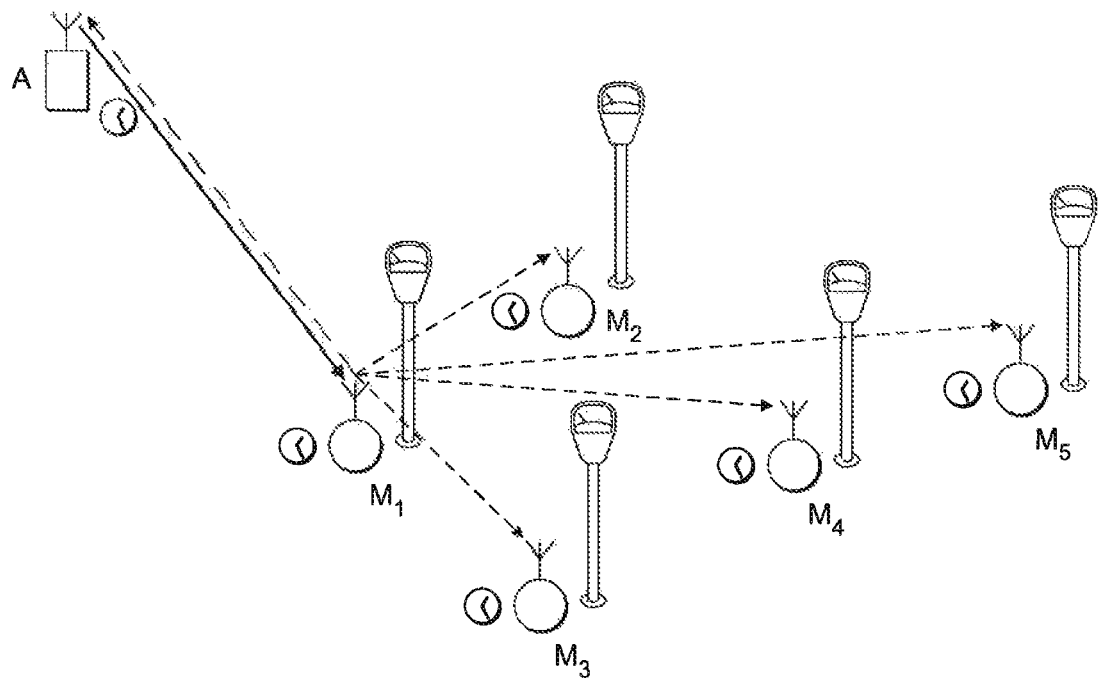
FIG. 8 illustrates the positioning of parking meters.

FIG. 8 illustrates the positioning of parking meters. In this example, we have a large number of battery operated devices, whose positions relative to one another need to be determined, so that the system knows which meter is which. They may be rather close together, which makes accuracy difficult when relying on measurements to distant base stations—a situation complicated by the effects of multipath between the base station and the cluster of meters. Also, in this example, energy consumption and efficiency are important, so as not to degrade the battery lifetime of the meters. The uplink transmission from the neighbour parking meter provides a useful local signal for positioning, with strong signals and good geometrical distributions.

As the illustration shows, the uplink signal can also be overheard by the multiple devices in the cluster of meters, so a single transmission can be used for multiple measurements. This gives excellent radio network efficiency, because it does not use much network capacity. It also gives good power efficiency, because only one message needs to be transmitted by the device, and not multiple ranging messages, one to each receiver.

For example, a complete system for establishing position (and time) at all of $N_M$ meters could involve the transmission by each meter modem of an uplink signal to the base station, each uplink signal being measured by all ($N_M$–1) other meter modems. This gives a total of ($N_M^2$–$N_M$) measurements from just $N_M$ uplink ranging messages.

Figure 9:
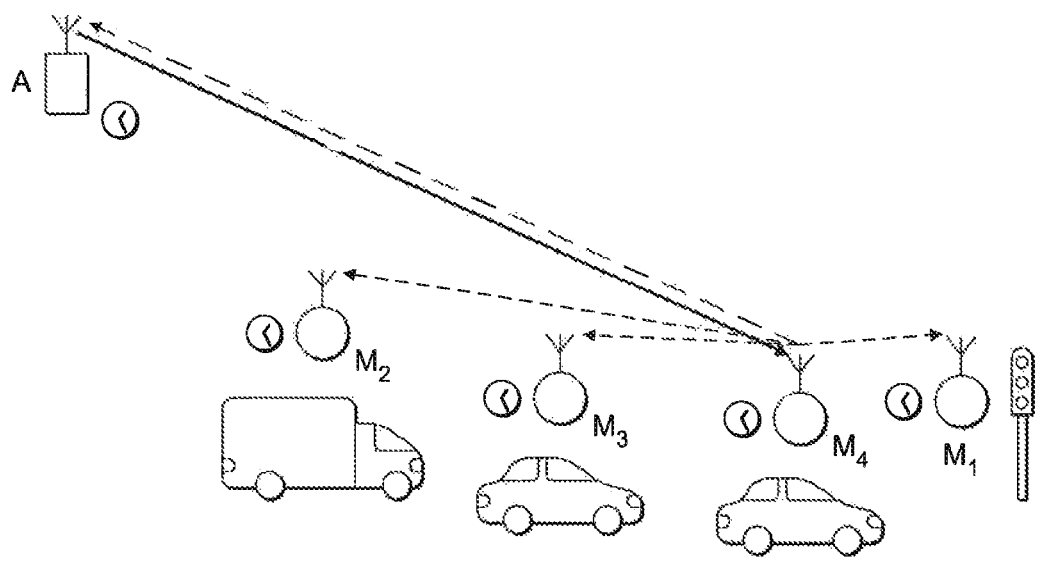
FIG. 9 illustrates vehicle-to-vehicle positioning.

FIG. 9 illustrates vehicle to vehicle positioning. In this example, we also have a large numbers of uses—in this case vehicles, which are moving around but which need to know their separation from each other in order to avoid collision. Because the vehicles may be moving rapidly, it is important that positioning measurements can be performed quickly. In particular, it is difficult to set up direct links between each pair of devices for performing a direct device-to-device ranging measurement for each. The high density of vehicles in an urban area, particularly when there is congestion, also leads to high demand on the spectrum capacity, so network efficiency is important.

As in the parking meter example of FIG. 8, the measurement of the uplink signals of neighbours provides local ranging measurements that can be used for positioning. The separation between modems (and therefore vehicles) can be established by comparing the measurements of the uplink signals made by pairs of devices. This has the benefit that it cancels the effects of clock offsets. There may also be some fixed roadside features, relative to which the vehicle should establish its location. In this example, we illustrate the roadside feature (a traffic light) also making the measurement of the uplink signal from the vehicle, which can be used as part of the positioning system to find the location of the vehicle relative to the traffic light.

Figure 10:
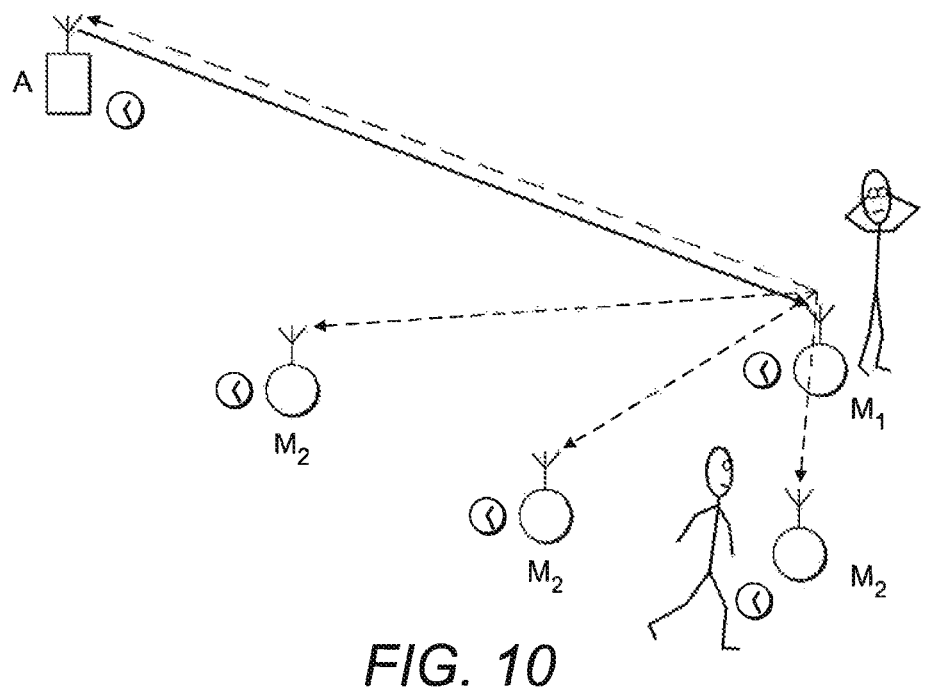
FIG. 10 illustrates a search and find application.

FIG. 10 illustrates a search and find application. In this example application, a single listener makes a number of measurements of the uplink signal from a neighbour, each measurement being made in a different location. The measurements are then combined to estimate the location of the neighbour. The uplink monitor measurements may be made by a First Responder to improve the positioning performance of an uplink measurement system for emergency calls. The estimation of location is easiest if the successive locations of the device listening to the uplink are known or can be related to other known locations, and if they have a good geometrical spread to the neighbour.

A particularly interesting feature of this use case is that the device in the unknown location, which in this case is the donor, can remain in continuous connection with the cellular network base station throughout the process—which can be very helpful, for example in emergency call applications.

This example illustrates that uplink measurements can be made at different times, and either by one device or multiple devices. It also illustrates that it may be the donor device (as in the example of FIG. 10), and/or the listening device (as in the example of FIG. 7), which is located by means of the measurements of the uplink signal.

Cellular System

Figure 11:
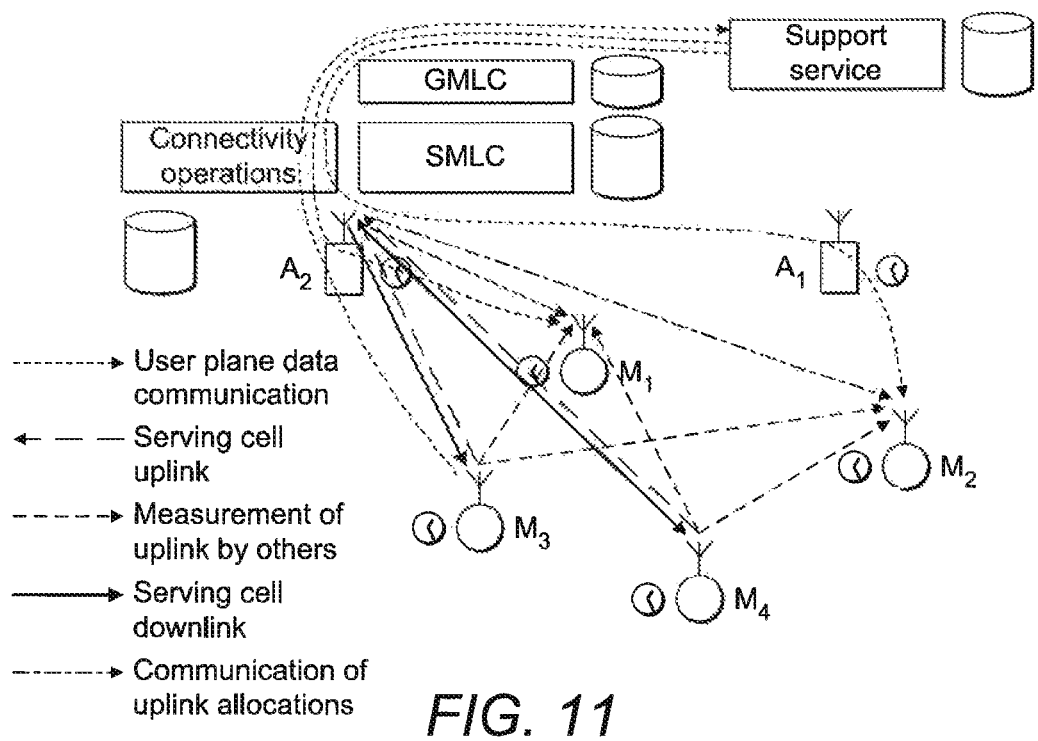
FIG. 11 is a sketch of a cellular network performing neighbour uplink measurement positioning.

FIG. 11 is a sketch of a cellular network performing neighbour uplink measurement positioning.

The normal communications functionality of the network is delivered by the infrastructure of base stations and connectivity operations software and databases, together with the mobile devices, with downlink and uplink communications between the modems and their serving cell base station. There may be positioning functionality provided by the network operator, with access via a Gateway Mobile Location Centre (GMLC) to provide location services (LCS) to the application. Location may be estimated by a Serving Mobile Location Centre (SMLC) that calculates the position of the device using the cellular signals, using the measurements of the time of arrival of the uplink signal at base stations. Third parties may also provide positioning systems, on top of the cellular infrastructure, using observations and measurements made by devices, and communication over the user plane.

For neighbour uplink positioning, modems listen to and measure the time of arrival of the uplink signal transmitted by neighbour donor modems to their base stations. There is considerable flexibility in the system design, as described below.

Donor and Listener Roles

A modem may act as a donor or as a listener, or indeed undertake both roles. The configuration will depend on:
 power consumption (comparing the energy for the donor transmissions, with the task of listening);
 the sets of measurements desired (if lots of measurements are required relative to a fixed reference point);
 transmissions as part of the neighbour uplink measurement process (requests and data traffic from modems can in themselves be used to provide donor uplink signals for measurement); and
 other activities (if a modem is active or connected then it may anyway act as a donor, providing signals that can be measured by listeners).

The swapping of roles between listener and donor, can be particularly useful in order to carry out a pair of listener-donor uplink measurements, as described elsewhere in this document.

Multiple Cells

The donor and listener do not have to be in the same cell—that is, the listener may monitor and measure the signal which the donor is sending to a base station which is not the base station of the listener. In fact, the listener does not even have to be on the same network, or radio technology, although of course it does need the capability to receive signals from the donor modem, and the other requirements of uplink measurement system operation. In the example of FIG. 11:
 Information to and from the listener modem flow via its own base station;
 It may be desirable for the listener modem to synchronise to, monitor and demodulate the control channels of the downlink of the donor's base station; and
 Monitoring and measurement of the donor modem and base station must be carried out without excessive disruption of the normal operation and connectivity of the listening modem with its own base station.

Service Functionality

Some functionality is necessary for supporting and using the measurement of the neighbour uplink for positioning. Uplink Measurement Management is concerned with arrangements for making the measurements. This will be described later, below.

The measurements are gathered and processed by a Positioning Engine (for example, at remote server 180) which estimates the position, using the measurements made. The functionality may be implemented:

In a distinct support service, communicating with the devices involved by means of user plane data connections established using the connectivity network(s);

As support services embedded within the network, for example as part of the SMLC; or Within the listening and/or donor modems, for example with local cache information or a live position-calculation capability.

The appropriate choice will depend on the overall system functionality, latency, power consumption, traffic cost, and business model. A good system design may involve a mix of functionality, distributed across services and modems.

Use of GNSS

Modems, whether listeners or donors, may in addition have positioning information, which is of assistance to the positioning engine. The position may be obtained from a Global Navigation Satellite System (GNSS), or from the manual entry of information by a user. If the modem is fitted with GNSS, it may have knowledge of accurate time and so be able to time-stamp transmission or reception of signals.

Measurable Uplink Signals

In principle, any uplink signal and message transmitted by the donor (first UE 112) to the base station may be overheard by a listening modem (wireless communication device 110). A number of messages and signals are of particular interest:

An uplink protocol message originating from the mobile, such as a random access channel request by the UE for registering to the network, requesting resources, or for synchronisation (notably in LTE, the RACH). This is typically initiated by the donor modem.

An uplink protocol message, arising following action by the cellular network such as the uplink acknowledgement by the modem of receipt of a downlink (control or data) message. This is a consequence of the network and base station activity.

Uplink signals associated with the operation of the connectivity system, for protocol purposes or particularly for synchronisation, or for channel sounding measurement purposes, used by the base station for assessing the path from the modem to the base station (notably in LTE, the Sounding Reference signal, SRS). This is typically the widest bandwidth signal available. It is scheduled and determined by the network and base station.

Uplink traffic associated with data communication, such as the data, preambles, associated frame messages, and pilot and reference signals (notably in LTE, the DeModulation Reference Signal, DM-RS, used for the uplink channel estimation). This is configured by the network and base station, as part of its setting up of the uplink communication channel for use by the device. The signal is fairly wideband—the same bandwidth as the uplink data signal allocation being used by the modem—giving the possibility of good accuracy.

Uplink signals specially designed for the measurement of time of arrival of the signal at the base station and used for estimating the position of the device by the infrastructure. This may be scheduled by the infrastructure.

As noted, these signals may arise:

during normal operation of the donor modem, and the applications running on the donor device, and the services with which it is interacting;

as a result of a request from some uplink positioning function on the donor device, stimulating activity;

as a result of activity from a neighbour uplink measurement management function in the infrastructure, which triggers protocol activity and exchanges with the donor modem, and consequently uplink transmissions by the donors which can be intercepted and measured by other modems;

as a result of the neighbour uplink measurement management function in the service or on devices wishing to perform positioning, stimulating communication with the donor device and consequently generating uplink activity; or arranging that activity and an uplink message is scheduled by the donor modem to take place at a future time.

As an example the transmission of data by a uplink management service to a donor modem would cause the connection with the base station to be built up, and data to be sent to the donor modem, resulting in a sequence of protocol messages and acknowledgements, and uplink transmissions. These are then available for measurement by listening modems.

Neighbour Uplink Measurement Sequences

Since the donor and listener are not in direct contact—that is, since there is no wireless link between them—some coordination of the donor and the listener is involved in the listener making the measurement of donor's uplink signals. Embodiments can use and build on the facilities provided by the cellular communication network, as illustrated in the following three examples.

Example 1: Donor Schedules an Uplink Access Request

Figure 12:
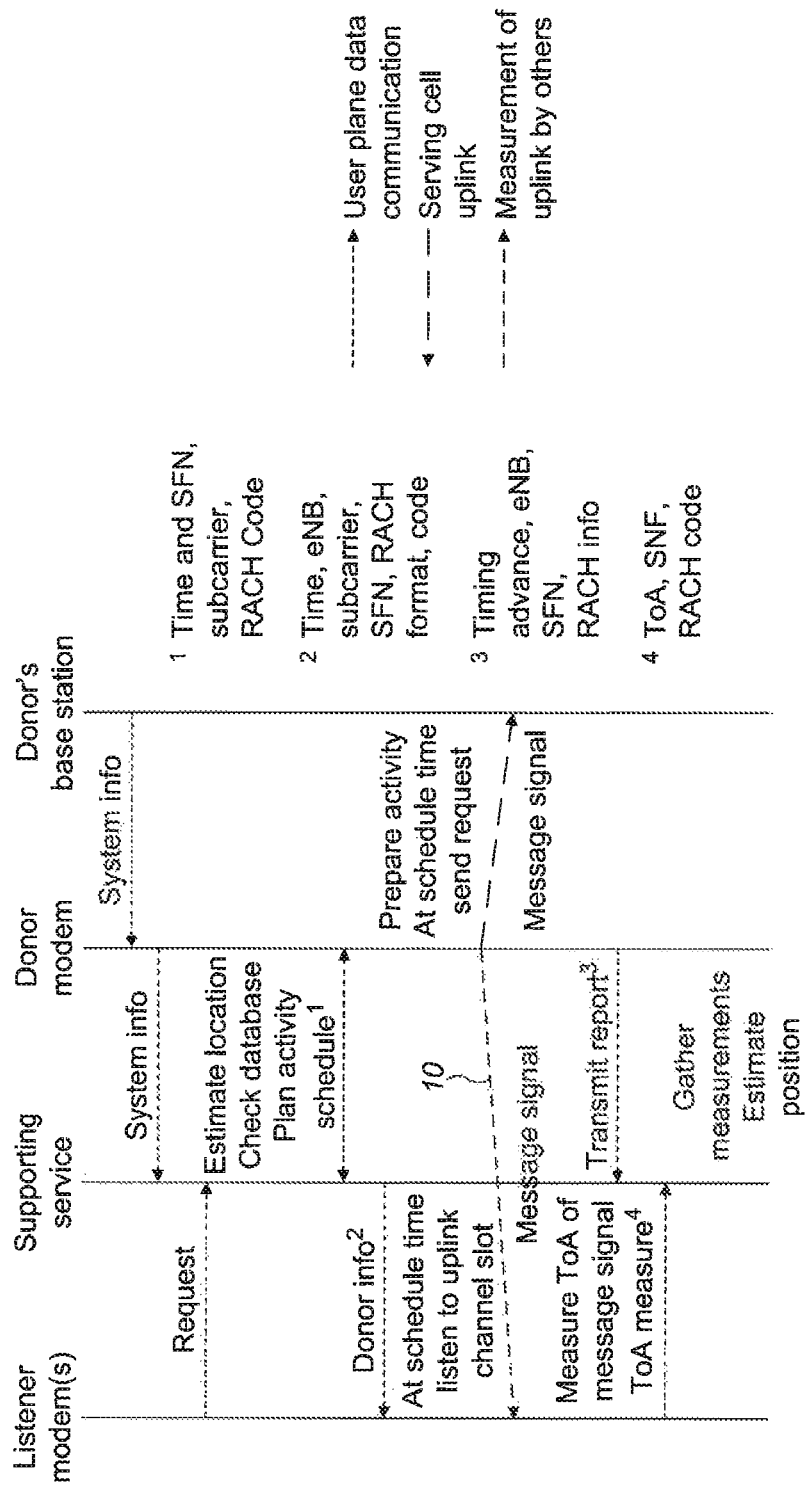
FIG. 12 is a sequence chart for scheduled measurement of a neighbour donor's access request.

FIG. 12 shows a sequence of operations for scheduled measurement of a neighbour donor's access request. In this example, it is assumed that there is a supporting service 190 and a pool of participating neighbours. It might perhaps be the building application use-case, described above with reference to FIG. 7.

The listener (UE 110) is in communication with the supporting service 190, via the cellular network and its base station 170 (which might not necessarily be the same base station as the BS 172 serving the donor modem), or by some other means. The listener requests a position, and the supporting service then arranges that the neighbouring donor modems will make transmissions at a schedule of times in the future. A number of donor transmissions may be scheduled, to serve the needs and requests of a number of listeners.

The uplink signal in this case is an access request (RACH). It is arranged with the donor that this will take place with a certain signature, and at a certain System Frame Number time. This arrangement reduces the likelihood of the listener measuring by mistake any other modem that happens to make an access request to the base station, and it also reduces the power consumption of the listening receiver, because the receiver can be enabled at the expected time of transmission of the access request.

The donor (UE 112) may need to suspend other ongoing activities and applications, and enter a network status (for example, idle mode) that will allow it to transmit the access request at the agreed time. The listener (UE 110) is informed of the scheduled transmission time, the subcarrier that will be used, and the RACH signal format (determined by the network) and signature (determined by the modem, but possibly influenced by the supporting service) which the donor will be using. This helps the listener to identify the correct uplink signal. The listener modem then configures itself to perform the listening operation, disconnecting from its connection and changing frequency as necessary, and waits until the scheduled System Frame Number SFN time, when it measures the time of arrival of the donors uplink message to the base station. It then reports the time of arrival measurement(s) to the positioning engine (remote server 180), together with the signature measured. Note that, in this embodiment, it is assumed that the remote server 180 and the supporting service 190 are the same.

The donor modem may also confirm to the supporting service the sending of the message, the signature used (for checking consistency), and other useful timing information such as the current Timing Advance of the donor relative to its base station. From the set of such measurements of multiple neighbour donors, the positioning engine is then able to estimate the position of the listener (UE 110). It may be that occasionally the uplink signal of another transmitting modem is measured by mistake, but this can be discarded by the positioning engine as being inconsistent with the result of a position fix using the other measurements.

Example 2: Donor Uplink Data Reference Signal Measured

Figure 13:
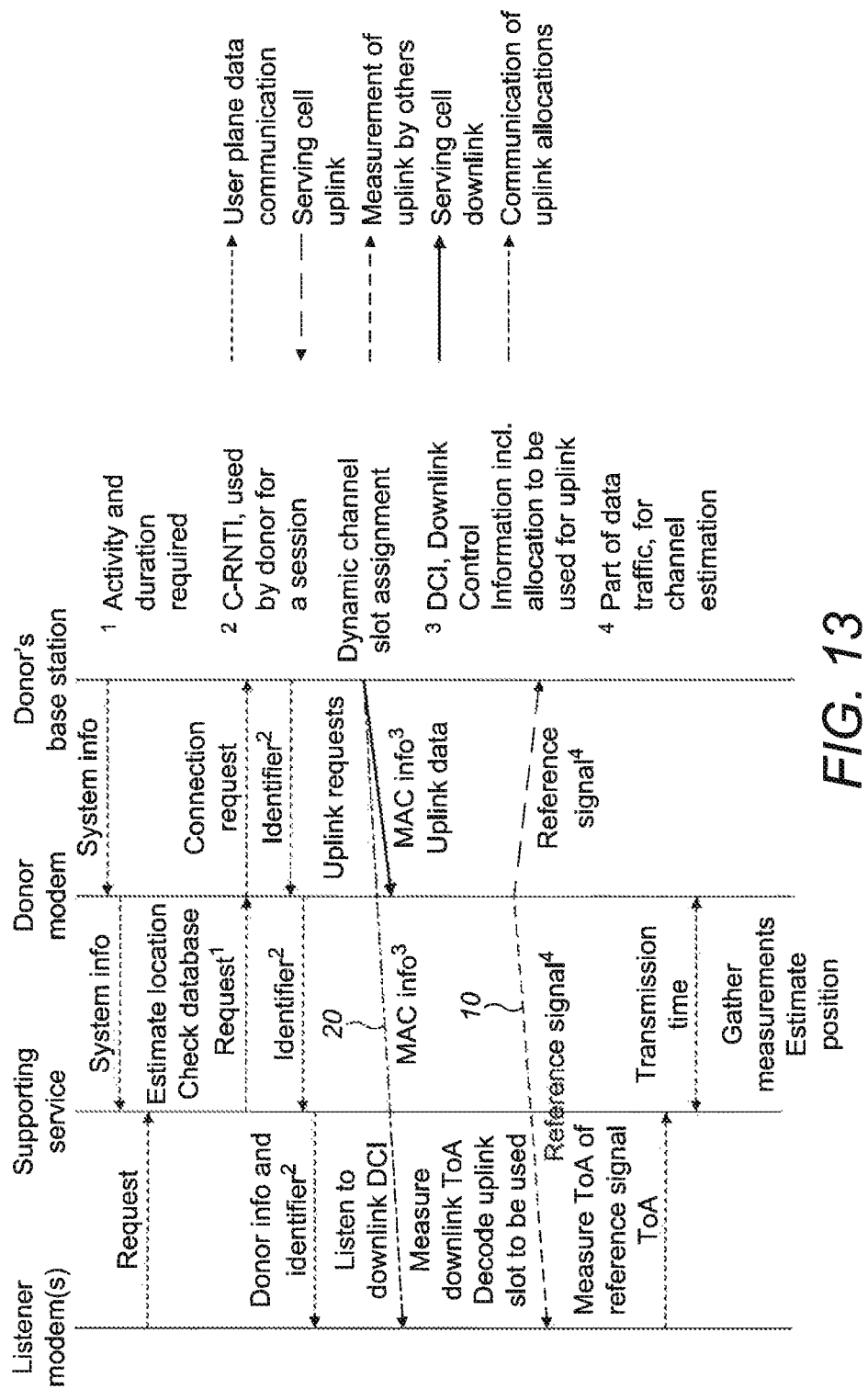
FIG. 13 shows a sequence of operations for a measurement using the uplink demodulation reference signal.
Figure 14:
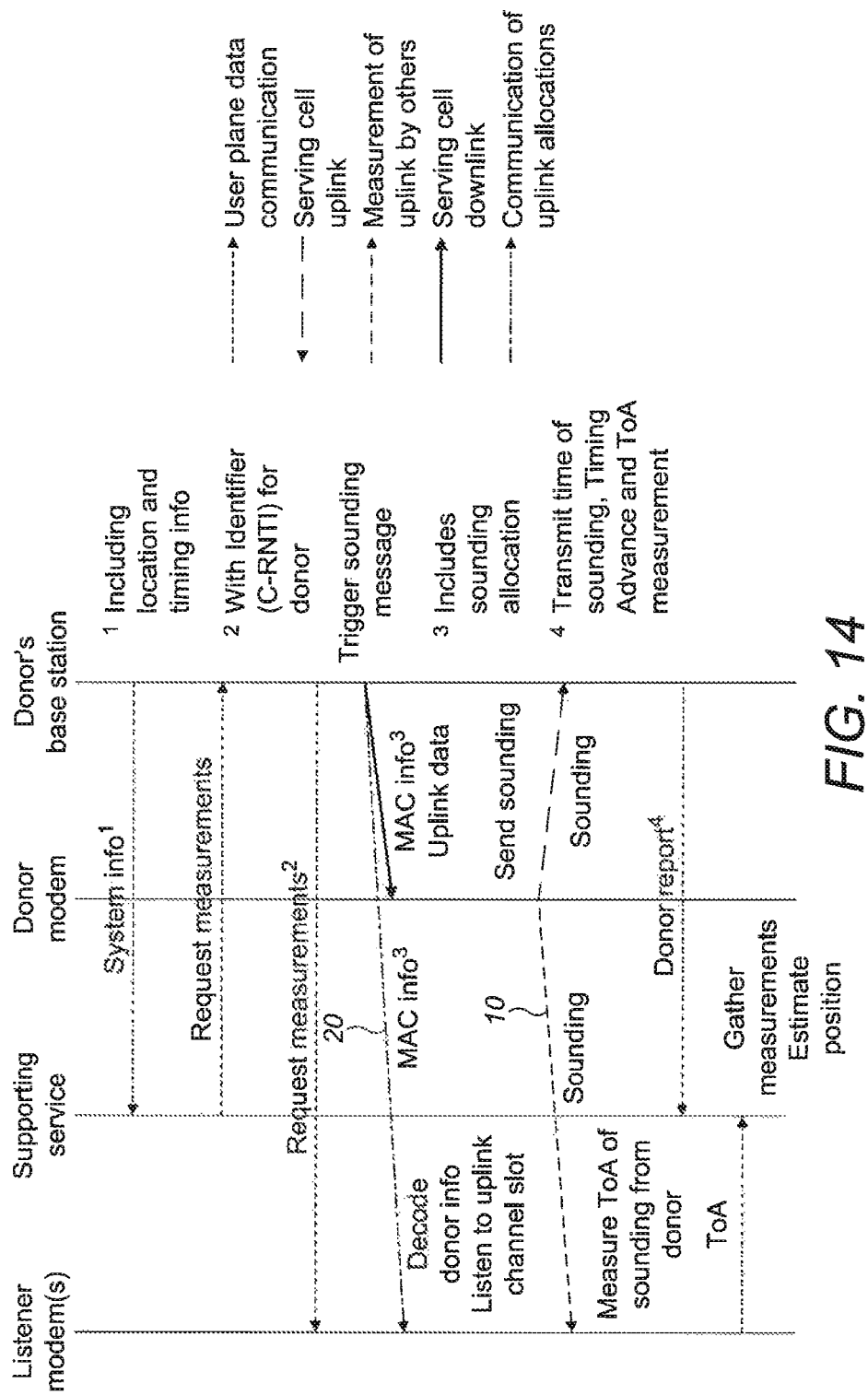
FIG. 14 shows a network managed sequence of operations for measuring neighbour donors' uplink soundings.

FIG. 13 shows a sequence of operations for a measurement using the uplink demodulation reference signal. In this example, we use a signal which has better properties for making accurate measurements, the demodulation reference signal (DMRS). This is part of the uplink data signal message, and so is visible when the neighbouring donor modem is in connected mode, transmitting uplink data. The channel allocations for the uplink are determined by the network, and are reported to all users in the Downlink Control Information block. Each connected modem extracts its uplink allocation from this information, with the individual allocations identifiable according to the Cell Radio Network Temporary Identifier (C-RNTI) provided to the modem when it connects to the network for a session.

In this case, following a request for a position, the supporting service 190 connects to the neighbouring donor (UE 112), establishing a connection by the donor to the network, and instructing the donor to remain connected for a period (in order to maintain the validity of the temporary identifier), and to arrange appropriate uplink data traffic, and hence associated reference signals.

The listener device (UE 110) is informed of the temporary identifier and the donor information by the supporting service 190. The listener will then accordingly configure itself to listen to the downlink 20 of the base station 172 serving the donor modem (UE 112). Note that, in general, this may be on a different frequency (or even a different network) to the listener's normal connection, so it may involve temporary disconnection from the normal network of the listener, and synchronisation instead to the donor's base station 172.

From the DCI block, the listener (UE 110) overhears the control information being sent to the donor and identifies the uplink resource allocation which the donor will use for the reference signal. (The control information is sent a few frames before it is required to be used.) Additionally, as the listener is receiving the downlink 20 from the donor's base station 172, it can also measure the time of arrival of the downlink signal 20, and can report this also to the positioning engine (remote server 180). This is helpful additional information for the positioning engine.

With this uplink resource allocation information, the listener is then able to receive and measure the time of arrival of the reference signal in the uplink data message transmitted by the donor. (Note that the uplink frequency of the donor might be a different frequency to the normal uplink of the listener, if the donor is operating on a different cell or network.) The listener then reconnects to its base station 170 if necessary, and reports to the remote server 180/supporting service 190 its measurements of the neighbour donor uplink time of arrival, together with the time of arrival measured for the donor base station downlink. The service meanwhile also gathers other measurements, times of transmission and other location information, and calculates the position.

Example 3: Network Managed Neighbour Uplink Soundings

FIG. 9 illustrates a network-managed sequence of operations for measuring neighbour donors' uplink soundings. In this third example, we illustrate a sequence managed by the network operator, and using modem measurements of a sounding signal transmitted by a neighbouring donor (UE 112). The sounding signal is a wide band signal designed for the network operator to use to characterise the uplink channel, and is transmitted by the modem on demand by the network operator. Its transmission by a modem follows instruction transmitted on the Downlink Control Information channel. It may also be received by listening devices to measure the time of arrival and range from the donor.

In this case the supporting service 190 is a part of the network operations, and has all the network information at its disposal, including information about the modems on the network. When it receives a request from an application, it issues a request via the network for a set of neighbour measurements to take place. Connections are made by the network to the modems, and the listener (UE 110) is instructed to listen to the uplink slot in which the donor (UE 112) will transmit the sounding to the base station. For example, the network may:
provide the listener with the C-RNTI temporary identifier of the donor, to allow it to decode the Downlink Control Information block (in addition to the information for its own uplink communication allocation); or
provide the listener with the uplink allocation information to be used by the donor, directly.

Note that, in this particular example, information is provided to the listener to allow it to overhear the instruction to the donor, rather than providing a direct instruction from the network that the listener should listen to a signal from the donor. The latter would require protocol changes, to support such instructions.

When the sounding is sent by the donor to the base station, it is also measured by the listening modem. The listener sends the measurement to the supporting service for use by the positioning engine. The network also sends information to the positioning engine, including its own measurement of the time of arrival of the uplink from the donor and the current Timing Advance information by which the transmission time in the neighbour is offset from the donor's local estimate of frame time, and any known smaller timing offset. The positioning engine estimates the location of the modem, also using position information regarding the location of the base stations.

The coordinated management of the activity, the use of the wideband sounding signals, and the combination with time of arrival of the uplink measurements at the base station 172, make such a system attractive; however, it does need additional capabilities in the modem, network, and protocols.

Neighbour Uplink Measurement Management

To facilitate the measurement of the uplink signals of neighbours, some form of information gathering and exchange is desired, as described below. This may be implemented by direct communication between the active devices in the system (reference devices or targets), or facilitated by a support service, preferably with a database.

The uplink measurement management function is concerned with arrangements for making the measurements. It preferably:
- collects information about devices and particularly reference devices, and their location and activity;
- gathers information about base station frame timing and cell uplink allocations;
- selects an appropriate set of modems to participate in a positioning task (taking into account proximity, geometry, power consumption, measurement quality, traffic cost etc.);
- provides information about neighbour activity and/or requests to modems wishing to make and/or support measurement requests; and
- schedules donor activity and listener measurements Examples of the operation of a measurement management service will be described later below.

Neighbour Selection

Uplink signals from any or all neighbouring devices, and measurements by all capable modems, may be used for positioning purposes. However, this will normally not be a particularly efficient use of resources, spectrum capacity or energy. For a particular positioning task (that is, the desire to provide a position estimate for one or more devices) a subset of the possible devices may be selected by the neighbour uplink measurement management. Selection of a suitable set of neighbour devices may be on the basis of criteria such as:
- Neighbours being a member of the community of devices prepared to assist in positioning of other devices (subscribing to the same network or positioning service provider, or being supplied by same positioning system/device manufacturer);
- Neighboring donor modems that are able to provide identity information, or have already or recently done so;
- A set of donors on a reduced set of channels, to simplify the measurement task of the receiver (for example, able to receive multiple signals on the same frequency channel);
- Neighbours having plentiful resources (such as a power supply) or donors engaging in plentiful uplink transmission;
- Donors with favourable uplink signal characteristics, such as a wide bandwidth signal channel allocation;
- Donors likely to produce an uplink signal with good signal to noise ratio at the likely location of the receiving listener modem (in other words, donors that are expected to be in the same vicinity); or
- A set of neighbours likely to produce a helpful geographical and geometrical distribution to support positioning by trilateration, well distributed horizontally, ideally around the boundary of the likely location of the listening device, and also vertically (particularly for the in-building use case).

As mentioned previously above, a neighbour uplink measurement management service may contain and provide this information to a listening device, or it may provide information such as the signal properties of the donors, their schedules, and their locations. Alternatively, this management functionality may be distributed—for example, with the donor devices providing the necessary information; a service or communications facility transporting and/or storing the information; and the listening devices using and acting upon the information, to make an appropriate selection of uplink signals to measure.

Local Uplink System Operation

In order that a listener may overhear the transmissions of a donor it should have knowledge of the operation of the uplink being used by the donor. This is particularly relevant as the donor may be operating connected to a different base station, on a different channel, indeed on a different radio network to that of the listening terminal.

Information about the uplink signal to be intercepted and measured includes:
- The channel (for example, frequency) and other parameters (such as bandwidth, number of OFDM channels);
- The frame timing structure and sub-channel allocations (such as the timeslots allocated for random access by devices); and/or
- The actual timing of the frame (compared to some reference, such as UTC, or some other reference, such as the timing of a second base station)

This information may be gathered from:
- A listener terminal monitoring, measuring, and interacting with the base station serving the donor modem, enabling the listener to:
  - synchronise to the cellular base station frame timing;
  - establish the frame count and clock for the donor;
  - identify the slots within the frame structure that are used for the different purposes; and
  - extract information from downlink control messages, relating to the donor modem and its uplink allocation,
- Information provided by the donor device, as a result of its interaction with the network, and/or
- Information provided by the network operator.

Signal Coordination

In order for the uplink signal from a donor to be measured, the listener terminal (UE 110) must be listening when the donor is transmitting. This might not be straightforward, particularly if power consumption, battery life and latency are important. It would be possible for the listener to be continuously monitoring the radio channels, opportunistically waiting for the transmission by a donor. This may be appropriate for mains-powered devices, or devices only requiring a very occasional position fix, when the energy consumption involved can be tolerated. Indeed, measurements may be made opportunistically, while the listener is engaged in other activities. However, this is an inefficient approach. More effective is some form of neighbour uplink management service to facilitate the measurement of a neighbour signal by the sharing of information. Possible approaches include:
- Engagement with the system, to monitor the uplink radio channel at times particularly likely to be used by donor devices (for example, in time slots when UEs transmit to gain access to the wireless channel, or when they are likely to respond to acknowledge messages for their continued membership of the network);
- Stimulation of the neighbouring device to cause it to transmit a message that can then be measured (by request from the listener device, or via interaction with a coordinating service); or
- Management of the system by an application service of which the modems and neighbours are members, which triggers appropriate interactions with the devices on the network according to a schedule that allows the uplink transmission to be measured by devices in the vicinity.

Examples of sequences of operations that result from the operation of an uplink management function have been described already above.

Uplink Signal Management

The signal used by the donor may be actively managed by and with the neighbour uplink management system. This may include the advance sharing or instruction of parameters for a random access request, in order to facilitate its efficient and effective use by other devices for reception and time of arrival measurement, including:

the code to be used by the donor (chosen to minimise confusion with the signals from other donors); and/or the accurate time of its transmission (System Frame Number, SFN) and frame timing offset.

Other parameters may also be shared or instructed in advance, relating to the activity of the device once it has established a connection, including:

the duration of a connection (in order to keep an allocated temporary identity current); and/or the data to be sent (to determine the channel occupancy, bandwidth and duration, for measurement).

If the donor device (UE 112) is connecting to the listener (UE 110) via the base station, or is connecting to the service, then this further sharing or instruction may take place dynamically, during operation, as is the case in Example 2, above.

Identity Information Exchange

As has been remarked, identity information is required, so as to separate uplink signals, and/or to associate them with particular devices. This device-specific identify information may include:

device logical identity information, such as the Cell Radio Network Temporary Identifier (C-RNTI) provided by the network to the terminal in LTE;

MAC information, such as:

a time slot to be used for a Random Access Channel (RACH) transmission, the time and frequency resource block(s) to be used for an uplink data transmission;

coding information, such as:

the code used by the donor modem for its transmission; and/or data information, such as:

indication of a particular data sequence or details of the signal transmitted, to facilitate its identification and use.

If for some reason a connection by the donor is broken, and has to be re-established, then the network operator might allocate it a fresh temporary identifier (C-RNTI), in which case this updated information should preferably be shared with the listening device(s).

The gathering and sharing of this identity information may arise in a similar way to the local uplink system operation, described above. This may include one or more of:

Monitoring, decoding and measurement by a listener modem of the downlink signal from the base station serving the donor modem. This is desirable because the downlink DCI message from the base station instructs the donor modem which MAC resource block to use for its forthcoming uplink data communications. The listener modem can also receive this, and if it knows the C-RNTI identity (see below) for the donor modem, can decode the instruction and establish the uplink MAC resource block that will be used by the donor.

Information provided by the donor modem, as a result of its interaction with the network. Examples include:

The reporting by the donor modem of the C-RNTI that has been allocated to it, so that the listening device can interpret the DCI messages from the base station and determine the resource block allocated to the modem;

The choice by the donor modem of the signature it chooses to use for the RACH request; and/or Its planned time of transmission of the signal, generally or in terms of the local frame time.

Information provided by the network operator, which is aware of the uplink allocations to the mobile devices which are connected, and can provide this information to the listening device.

Position Estimation with Neighbour Signals

A Positioning Engine (remote server 180) gathers the measurements and information available, and produces an estimate of the result. It preferably:

collects measurements;

gathers and stores information about base station and modem location and precise timekeeping; and produces position and/or time estimates and information, optionally with uncertainty information.

In a typical "Internet of Things" deployment there will be multiple sensor devices, all of which are able to make and share measurements. These may include measurements of the neighbour uplink, optionally together with measurements of the downlink from the base station. This can give considerable richness of data, which can be exploited by a positioning system. This data can optionally also be combined with measurements of the uplink signals by the base stations.

Neighbour Modems' Uplink Signals

Figure 15:
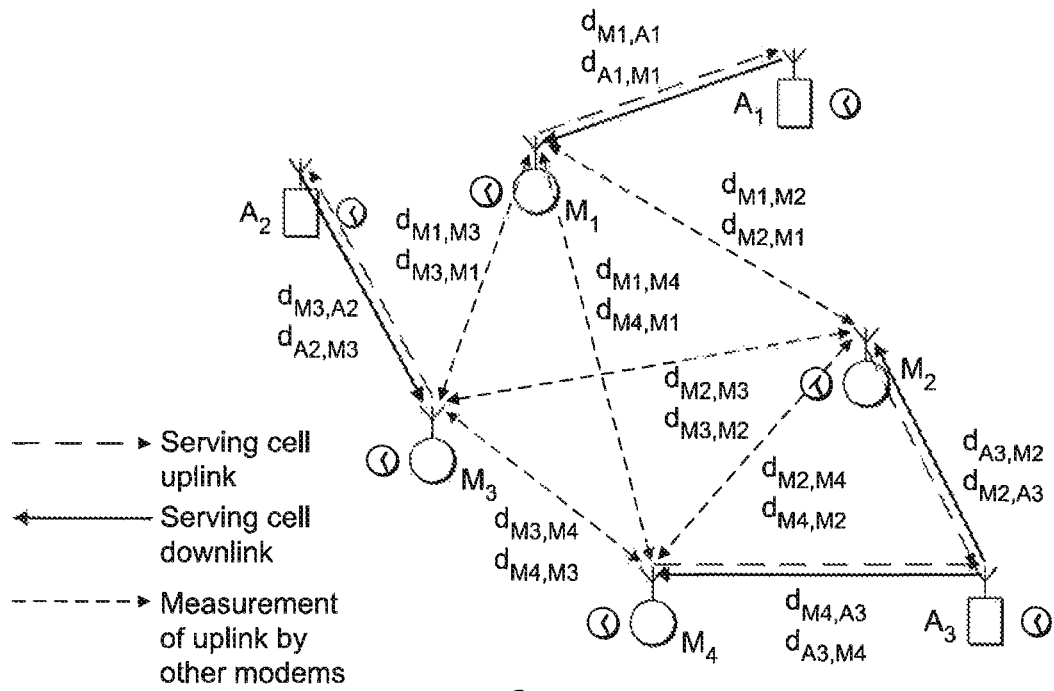
FIG. 15 illustrates an example of measurement of neighbours' uplink signals by modems in a cellular network.

For measurement by modems of the uplink signals sent to the base station by neighbours, the FIG. 15 shows the uplink signals of the network connectivity, together with the possibility that these signals can be received and measured by other (listener) modems in the vicinity.

This shows the set of measurements in principle possible by monitoring the uplink signals from neighbouring mobile devices. It can be seen that the local distances between devices can be measured, which can be extremely useful for finding their relative position, particularly in comparison with the small differences between potentially long distance measurements that are a feature of the measurements involving the base stations.

Signals in both directions between any given pair of modems may be measured, giving pseudoranges not only for the uplink signal transmitted by M1 as measured by a receiver at M2, but also the uplink signal transmitted by M2 as measured by a receiver at M1. Such a system thus measures the pseudorange in each direction, $d_{M1,M2}$ and also $d_{M2,M1}$, which differ because of the different clock offsets of the transmitter in each case (which may be solved as part of the positioning solution). This possibility is discussed in further detail later below.

Modem Measurement of Downlink and Neighbours' Uplink Signals

Figure 16:
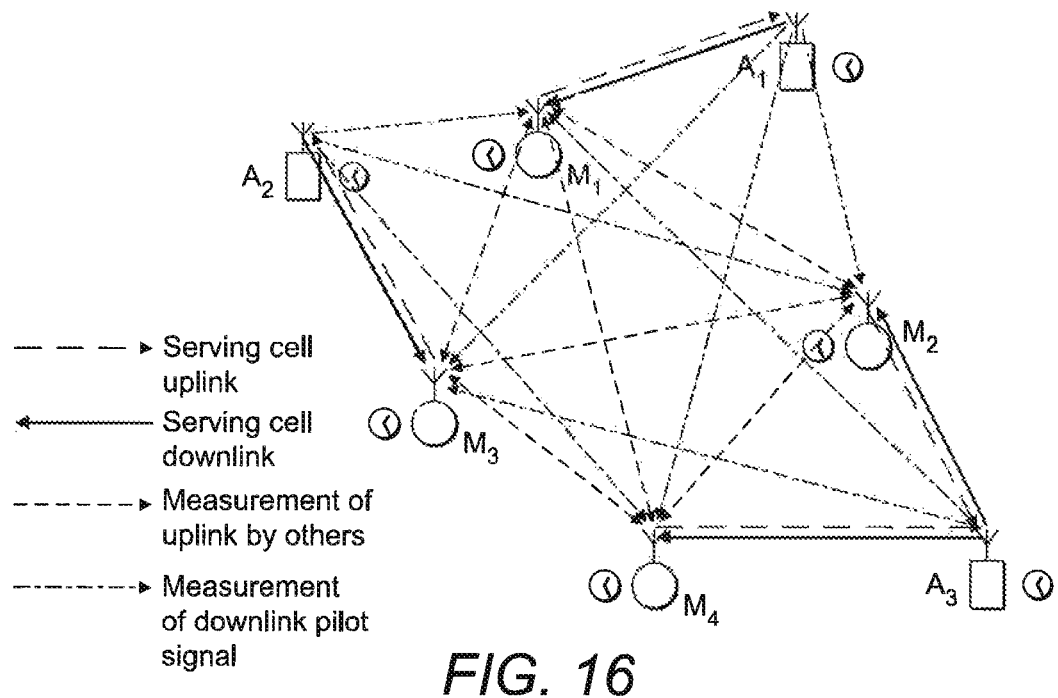
FIG. 16 illustrates a complete set of neighbour uplink measurements and downlink measurements able to be made by the modems in the network of FIG. 15.

Considering just the cellular system, but putting the neighbour uplink and downlink together, we then have all the measurements that can be made by modems able to measure their neighbours' uplink transmissions, as well as the downlink signals of the base stations. FIG. 16 illustrates this, for the case shown in FIG. 15.

Positioning Examples

A few examples will now be discussed, to illustrate the way measurements of neighbour uplink signals can be used to advantage in a manner analogous to known positioning techniques.

More complex solutions than these examples are also possible, potentially involving the explicit solution of the location of multiple devices and the transmission times and clock offsets of donors and listening devices. This will be outlined later below. The examples in this section serve to illustrate how positioning can be extracted for the case when the clock of the donor device is unknown and not of interest, and illustrate some of the usage applications and the desirability of the some of the measurements.

Each modem and base station will have its own local clock, and there is no global knowledge of time. As general terminology, let us consider that a signal s is transmitted from device i at time $t_{s,i}$ measured by its local clock with an offset of $\alpha_i$ as $T_{s,i} = t_{s,i} + \alpha_i$, and that this signal is received by device j at time $r_{s,j}$ measured by its local clock with an offset of $\alpha_j$ as $R_{s,j} = r_{s,j} + \alpha_j$, and with a propagation delay between the devices of $\tau_{i,j}$, then we have $$r_{s,j} = t_{s,i} + \tau_{i,j}$$

and as observed in terms of the local devices' clocks $$r_{s,j} = T_{s,i} - \alpha_i + \alpha_j + \tau_{i,j}$$

We will now consider a few useful special cases.

Time Difference of Arrival

If the signal from a donor modem is overheard by two listener modems, then each of the listener receivers can measure the time of arrival of the same transmitted signal. The time difference of arrival can then be computed, so that the transmission time of the signal no longer has an effect, as follows.

If we have a message received by a pair of modems, j and k, then:

$$R_{1,j} = T_{1,i} - \alpha_i + \alpha_j + \tau_{i,j}$$

$$R_{1,k} = T_{1,i} - \alpha_i + \alpha_k + \tau_{i,k}$$

So we have the time of arrival difference:

$$R_{1,j} - R_{1,k} = \alpha_j - \alpha_k + \tau_{i,j} - \tau_{i,k}$$

$$(\tau_{i,j} - \tau_{i,k}) = R_{1,j} - R_{1,k} - (\alpha_j - \alpha_k)$$

The time difference of arrival at the two modems thus gives information about the difference in the distances to the two modems, $c \cdot (\tau_{i,j} - \tau_{i,k})$, and a correction depending on the relative time offset between the listening modems, j and k, and can as solved to give a locus of potential position locations and relative time offset using known hyperbola-based positioning techniques.

This technique does not need any active cooperation or involvement of the donor device in the positioning. It relies instead on the listening devices noting identity information for the signal, at least at the MAC level, and associating together the signals received at the listening devices, as coming from the same donor device, and being the same transmitted signal.

The usefulness of this technique is that no information need be known about the transmission time at the donor device, and that uncertainties or tolerances in the signal time of transmission also have no effect. It can form the basis of more complex positioning systems, by forming multiple Time Difference of Arrival measurements from pairs of listening devices.

Two-Way Measurement

If we carry out a pair of measurements and we know the difference in the transmit and receive times within each device, then the clock offsets of the devices can be cancelled out, as follows.

If we have two messages, between the pair of devices, then $$R_{1,j} = T_{1,i} - \alpha_i + \alpha_j + \tau_{i,j}$$

$$R_{2,i} = T_{2,j} - \alpha_j + \alpha_i + \tau_{i,j}$$

and since the propagation delay is the same in each direction we can sum the two to give $$R_{2,i} + R_{1,j} = T_{1,i} + T_{2,j} + \tau_{i,j} + \tau_{j,i}$$

$$\tau_{i,j} = \frac{(R_{1,j} - T_{1,i}) + (R_{2,i} - T_{2,j})}{2}$$

$$\tau_{i,j} = \frac{(R_{2,i} - T_{1,i}) + (R_{1,j} - T_{2,j})}{2}$$

So, the propagation delay can be found from just the transmit and receive times of the two signals in the local clock domains. Note that device i=1 transmits signal s=1 and device j=2 transmits signal s=2. Hence:

$$\tau_{1,2} = \frac{(R_{2,1} - T_{1,1}) + (R_{1,2} - T_{2,2})}{2}$$

This technique involves the active cooperation of the second device, as the second device transmits the second signal at a (local) time offset which is known, compared to the time of arrival of the first signal. An advantage of this is that no information need be known about the absolute transmission time of the devices, and it simply and directly gives information about the relative separation between the devices.

Neighbour Uplink and Base Station Downlink Time Difference

The combination of an uplink measurement together with the measurement of the time of arrival of the downlink signal from the donor's base station is convenient, particularly as the downlink signal from the base station may anyway be received and monitored either if it is the base station of the listening receiver, or to extract information about the scheduling for the donor modem.

The uplink signal transmitted from device i and received by listening device j is $$R_{U,j} = T_{U,i} - \alpha_i + \alpha_j + \tau_{i,j}$$

and similarly the downlink signal transmitted by the base station, device 0 and received by listening device j is $$R_{D,j} = T_{D,0} - \alpha_0 + \alpha_j + \tau_{0,j}$$

where $\tau_{0,j}$ is the propagation delay from the base station to the listening device, and $\alpha_0$ is the local clock offset of the base station.

Forming the difference of the measurements of the time of arrival of the neighbour uplink and the downlink signals we have $$R_{U,j} - R_{D,j} = T_{U,i} - T_{D,0} - (\alpha_i - \alpha_0) + \tau_{i,j} - \tau_{0,j}$$

giving $$(\tau_{i,j} - \tau_{0,j}) = (R_{U,j} - R_{D,j}) - (T_{U,i} - T_{D,0}) + (\alpha_i - \alpha_0)$$

This expresses the difference in the propagation distances from the donor modem and from the base station, as a function of the difference in the time of arrival of the two signals at the listener, and the difference in the time of transmission of the uplink and the downlink signals at the donor modem and the base station, together with the corresponding local clock offsets. Note that as it is a difference measurement, the local clock offset of the receiving device has been cancelled out of the expression and has no effect.

In a cooperating system, information may be available about the transmission times of the donor modem and the base station. Meanwhile, in many cellular systems there is further information available as a result of the system design of the cellular network. In particular, the system may be designed so that the uplink signal is transmitted by the donor at a time such that it arrives at its serving base station at a known time, synchronised with the base station.

This gives the additional relationship:

$$R_{U,0} = T_{U,i} - \alpha_i + \alpha_0 + \tau_{i,0}$$

which, by rearranging to $$T_{U,i} = R_{U,0} + \alpha_i - \alpha_0 - \tau_{i,0}$$

and then substituting into the above, gives $$(\tau_{i,j} - T_{0,j}) = (R_{U,j} - R_{D,j}) - (R_{U,0} - T_{D,0}) + \tau_{i,0}$$

This useful relationship gives the difference in propagation delays from the donor modem and from the base station, as a function of the time difference of arrival of the signals from the donor and the base station, the time difference between the reception of the uplink signal at the base station and the transmission of the downlink signal by the base station, and the propagation delay between the donor and the base station. The clock offsets of the base station and of the donor have cancelled out, and have no effect.

As has been mentioned, the difference between the reception of the uplink signal at the base station and the transmission of the downlink signal by the base station may be known and well controlled as part of the operation of the cellular network, for example the timing may be set such as to arrive at a particular part of the base station frame structure, to within a certain tolerance, and the number of elapsed frame intervals between the reception and transmission events will normally be known. The propagation delay between the donor modem and the base station may be known (for example from knowledge of the base station location and the donor location), or it may be known by the cellular system and, to a certain accuracy, the donor modem as the Timing Advance by which the donor modem is instructed to adjust its timing in order to achieve synchronisation of the uplink signals on their arrival at the base station. This relationship therefore gives the positioning engine a hyperbolic difference curve for the locus of possible listener locations, depending on the measured difference in the time of arrival between uplink and downlink signals, and the other information about frame timing and propagation time between the donor modem and its base station.

A similar approach may be followed in a network-managed system such as that described in Example 3 above, by combining the neighbour uplink measurements with the normal uplink time of arrival measurements made at the base station.

Using Neighbours with GNSS

A simple solution for positioning is applications in which donor devices are reference devices with GNSS, and are in communication with the positioning engine. In this case, the location and timing of transmission and reception events by the donor devices are known, and they are effectively known transmitters, allowing the location and time of a device without GNSS visibility to be estimated. For example, if all the devices are u-blox devices having GNSS and subscribing to a CellLocate service, then if:

device $M_1$ is indoors and unable to receive any GNSS signals; but devices $M_2$, $M_3$ and $M_4$ are outdoors and able to establish their position from GNSS, then the position of the target device $M_1$ could instead be estimated by measurement and triangulation of the uplink signals from the donor modems $M_2$, $M_3$ and $M_4$. Furthermore, if the listener modem has GNSS then a combined position estimate may be performed using the cellular and GNSS signals. For example:

Some GNSS signals may be available to $M_1$, and a combined position fix may be performed using a combination of the GNSS signals and donor modems' uplink signals; or For a timing application, the reception of the uplink signals from a single donor device $M_2$ may be sufficient to provide a good time estimate, either for the application running on the device $M_1$, or to provide accurate timing assistance for the GNSS on $M_1$, so that it can itself acquire satellites successfully.

A similar use of this principle was illustrated in the search and find application, discussed previously above, with the measurements in this use case being undertaken by a single modem, the modem of the searcher, which is listening to and measuring the signals from the target modem at different times, and with the searcher in different locations. As the searcher device knows its location, for example from measurements with GNSS augmented by an inertial navigation system, times of arrival are used together with the known locations and timekeeping of the searcher to estimate the position of the target.

Neighbour Uplink Positioning Assistance Information

In addition to information which is provided relating to donor devices so that the receiver can acquire, identify, and measure their signals, this information can also be used for positioning purposes in the Positioning Engine (remote server 180). The positioning engine gathers the uplink signal measurements of the neighbours, together with any other information, and performs the position and time estimation as discussed above. Particular assistance information relating to the uplink signal measurement(s) which is desirably provided to the position engine may include the following.

A first useful type of information is identity information. This can be used for identifying which signal came from which device, so that signals received from the same donor can be matched up—in particular, to link measurements made by different receiving terminals. This information may be MAC information, and/or logical identity information for the donor modem. The identity information may further be used to identify the actual device that transmitted the uplink signal. This is clearly essential to associate the transmission with the physical device, and its location and other properties.

A second useful type of information is timing information. As a further input to the positioning engine, the transmission time of the donor signal uplink may be made known. This is clearly helpful to establish the time of flight of a signal, and for comparing and using multiple transmissions by the donor at different times (as the offsets in their transmission times are known).

The timing information may be obtained by the positioning engine in a number of ways, including one or both of the following:
  Reporting by the donor of the time of transmission of the uplink signal, after it has been transmitted. This might be appropriate for an uplink signal transmission as part of a data transfer, transmitted under the management of the cellular network, as it is only after spectrum resource block allocation and signal transmission that the precise time of transmission is known by the donor, and able to be shared.
  Scheduling of the transmission to occur at a precise time, and making this information available. (Note that this information may be of much higher quality and accuracy than that of the scheduling and MAC resource block information, used for assisting signal measurement.) This might be appropriate in the case of a transmission initiated by the donor device, such as the RACH request for connection. In these cases, the timing of transmission may originally be determined by the donor device, or possibly influenced or determined by the donor uplink management service, as discussed previously above.
Any convenient time base may be used, such as:
  local clock time differences (for the time intervals between sets of transmissions)
  the received frame time of the cellular (downlink) signal;
  time interval relative to a received measured signal (for example, for two way measurement, discussed already above); or
  UTC time from GPS, if available.

Relative timing information known to the system or the donor is also of assistance to the positioning engine, particularly information relating to the time of arrival of the donor signals at their base station, and thereby to the propagation time between the neighbour device and its serving base station. This is part of the cellular system design, Timing Advance in GSM, and may be based on Round Trip Time measurements by the cellular system.

A third useful type of information is position information. Position information that may be known about the location of the neighbours is of course very helpful for the positioning engine. This may be from a GNSS device (for example, a GPS receiver), other sensors, or other previously obtained or manually entered position information.

The distance of the donor from its base station may be of particular assistance to the positioning information if it is also using measurements of the downlink signal, as it assists the estimation of the relative timing between the donor and its base station.

A fourth useful type of information is base station information. Position and timing information relating to the base station is helpful to the positioning engine, particularly to relate the signal timing to UTC, or if the downlink signal is used as well as the uplink signal (as described already above). This information may include one or both of: the location of the base station; and the UTC timing of the base station.

Functionality to Support Neighbour Uplink Measurement

Listener Role

In order for a mobile device to be able to measure and use the uplink signal transmitted by a neighbouring donor modem, the listening modem may require additional functionality.

A first aspect may be the ability to receive in the uplink band. Normally a UE will have the capability of receiving signals in the downlink band only. The extension to receiving the uplink signal may influence some or all of: the local oscillator frequency generation and supply to the receiver; the RF. filtering and/or duplexer arrangements, which may normally prevent signals in the normal transmit band from entering the receiver; and the filtering in the receive path, which now should also accommodate and suit uplink signals.

A second aspect may involve MAC processing and signal processing to distinguish and acquire the uplink signal(s). Individual uplink signals from different devices must be received and separated, in a manner corresponding to whatever technique is used for the uplink Medium Access Control, which may be a combination of time, frequency, and spreading code multiplexing, depending on the cellular system design. Normally, the receiver is designed to acquire the downlink signal—the uplink signal will often have a different air interface design in terms of signal bandwidth, modulation format, and synchronisation signals.

A third aspect concerns data demodulation to identify the uplink signal. It will typically be necessary to identify the uplink signal being measured, so as to use measurements of and by multiple devices. This may also be useful if there is communication with the donor modems for stimulating activity, or sharing measurement results or timing information. To some extent, the device may already be identifiable as a result of the MAC to separate the signal—for example, by the time slot, frequency, and spreading code used in its transmission. Further identification purposes may require the identification of a MAC property of the device (for example, the spreading code used by the transmission) or by demodulation of some part of the (uplink) signal to extract some form of logical device identity information. Conventionally, a mobile receiver does not need such functions, as the uplink of neighbours is not of interest. In addition, it might be desirable decode a frame count signal, for additional longer term timing information, although this will often be available from the normal downlink measurements making its measurement from neighbours unnecessary.

A fourth aspect concerns signal processing to measure the time of arrival of the uplink signal. After acquisition, the timing of the signal from the donor modem has to be measured by the listener terminal. This may be done, for example, by detecting and using any frame and synchronisation signals included in the uplink signal format, or any known data sequences or signal messages, including possibly protocol messages.

Additional functionality may also be required for neighbour base station downlink reception and measurement. As illustrated by the sequences of operation in Examples 1-3 above, it may be necessary to measure the downlink of the base station which is the serving cell for the donor, for the purposes of one or more of: establishing the frame timing of the donor; decoding uplink allocations to be used by the donor (for RACH channels, data traffic or soundings); and measuring the time of arrival of the signal from the base station. This may be required even if the donor is operating on a different cell to the listening modem, which may even be on a different network or radio technology.

Additional functionality may also be required in the software stack. The software stack may need to perform a number of additional functions within a listening device, including one or more of: instructing low level activities, including MAC decoding and the scheduling of reception and measurements at specific frame times; establishing the timing of physical layer measurements, and passing these to the positioning application; and maintaining a consistent timebase for the comparison of timing events.

The reception and measurement of many donor signals may have to be scheduled and carried out. This may have to run concurrent with normal modem activities. The software on the neighbour may also need, for the MAC signals being received, to: establish which MAC signal(s) being measured are from the same (known or unknown) donor; and determine identity information about the donor, which allows it to be associated with a known donor modem. This information may be obtained by interaction with the donor or supporting service.

Donor Role

A cooperating donor modem may provide additional functionality by being able to cooperate, for example by:
  undertaking uplink transmission activities for measurement by others;
  sharing network configuration information with others;
  scheduling uplink transmissions, possibly together with a supporting service and/or listeners and other neighbours;
  arranging suitable signatures (for example of the RACH message preamble), so as to avoid ambiguity; and/or
  sharing signature and identity information (including C-RNTI) with participating listeners.
A donor may also undertake and provide measurements of the downlink signal from its own base station.

Network Functionality for Neighbour Uplink Measurement

The network undertakes activities concerning connectivity, which involves establishing connectivity links and leads to uplink activity by donor modems. In some system configurations, the network may advantageously take a greater role, for example by:
  informing listeners of donor identity information or their uplink schedules;
  triggering the sending of sounding signals by donor modems;
  measuring the uplink signal time of arrival at the base station;
  providing information on the Timing Advance instructions and measurements to the positioning engine; and/or
  providing information on base station location and timing, particularly if it is provided with GNSS.

Positioning Measurables and Equations

Figure 17:
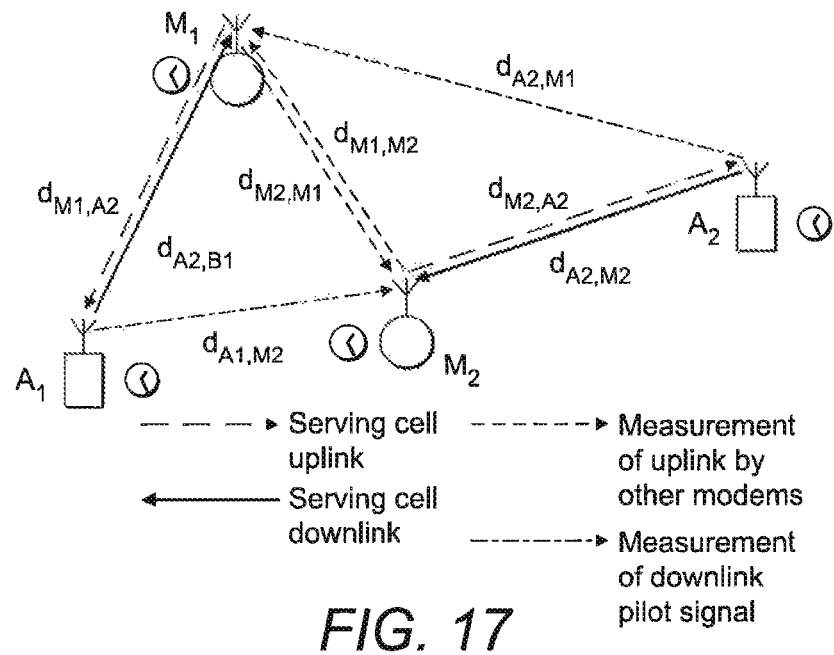
FIG. 17 shows a minimal case for generalised position measurement with two anchor base stations and two mobile modems.

If GNSS is not available and the location of all the mobiles is unknown, then in order to be able to solve for position we need to have at least as many measurables and knowns, as unknowns. Normally, to solve for the horizontal position and time of a mobile device we have three variables (latitude, longitude, and local time compared to transmitter reference time) and so need the signals from three synchronised base stations in order to be able to solve the set of equations and find the location of the mobile. Some useful special cases were considered earlier above; here, we consider the more general case. Let us take a minimal example for uplink as well as downlink measurements, as shown in FIG. 17.

We assume the base stations are in known locations and are synchronised, with known offsets (as a result of previous measurements). To summarise, we have 6 unknowns: namely, the latitude, longitude, and clock offset for each of the two mobiles. We therefore need six measurements, which can be the 4 downlink measurements, being the two by each mobile of each base station, and the 2 measurements by each mobile modem of the signal of the other modem. So, if all the measurements are gathered and brought together then a position can be calculated. This is possible even though in this case we only have two base stations, whereas normally, for downlink-only systems, we would require three base stations. This assumes that the times of signal transmission are known, and the geometry is favourable for a geometric solution.

In more detail, we can fully set out all the equations, unknowns and measurables, as follows. There are 6 measurement equations for the times of arrival measured by the modems, for signals sent out at a time relative to the base station clock and the other modem clock respectively and received and measured with respect to the modem clock. These consist of three measurements for each modem:

$$T_{A1,M1} = d_{A1,M1} + c\tau_{A1} - c\tau_{M1}$$

$$T_{A2,M1} = d_{A2,M1} + c\tau_{A2} - c\tau_{M1}$$

$$T_{M2,M1} = d_{M2,M1} + c\tau_{M2} - c\tau_{M1}$$

$$T_{A1,M2} = d_{A1,M2} + c\tau_{A1} - c\tau_{M2}$$

$$T_{A2,M2} = d_{A2,M2} + c\tau_{A2} - c\tau_{M2}$$

$$T_{M1,M2} = d_{M1,M2} + c\tau_{M1} - c\tau_{M2}$$

In general, with $N_A$ base stations and $N_M$ modems there are $N_M \times [N_A + (N_M - 1)]$ such measurement equations.

Then there are 5 equations for the geometry between modems and base stations, and between the modems, and considering for simplicity the 2D case, with the latitude and longitude coordinates of each device being (x,y):

$$d_{A1,M1}^2 = (x_{A1} - x_{M1})^2 + (y_{A1} - y_{M1})^2$$

$$d_{A1,M2}^2 = (x_{A1} - x_{M2})^2 + (y_{A1} - y_{M2})^2$$

$$d_{A2,M1}^2 = (x_{A2} - x_{M1})^2 + (y_{A2} - y_{M1})^2$$

$$d_{A2,M2}^2 = (x_{A2} - x_{M2})^2 + (y_{A2} - y_{M2})^2$$

$$d_{M1,M2}^2 = (x_{M1} - x_{M2})^2 + (y_{M1} - y_{M2})^2$$

In general, there are $$N_M \times \left[ M_A + \frac{(N_M - 1)}{2} \right]$$

such geometry equations. The full set of variables comprises: the coordinates and time offset for each of the four devices (12 variables); and the distances between the devices (5 variables). Therefore, there are a total of 17 variables. In general, the number of variables is:

$$3(N_A + N_M) + N_M \times \left[N_A + \frac{(N_M - 1)}{2}\right]$$

The 4 base station location parameters $(x_{A1}, y_{A1})$ and $(x_{A2}, y_{A2})$ are known, as are the base station time offsets, $\tau_{A1}$ and $\tau_{A2}$. In general, there are $3N_A$ such knowns. This is summarised in the table below.

TABLE 1

Illustrative knowns and variables for position estimation with uplink and downlink measurements, for a 2D solution, with known base station location and timing

| | Example, $N_A = 2$, $N_M = 2$ | In general |
|---|---|---|
| Time of arrival measurements | 6 | $N_M \times [N_A + (N_M - 1)]$ |
| Geometry equations | 5 | $N_M \times \left[N_A + \frac{(N_M - 1)}{2}\right]$ |
| Known in advance | 6 | $3N_A$ |
| Total knowns | 17 | $3N_A + N_M \times \left[2N_A + \frac{3(N_M - 1)}{2}\right]$ |
| Total variables | 17 | $3(N_A + N_M) + N_M \times \left[N_A + \frac{(N_M - 1)}{2}\right]$ |

The positions of the modems can be estimated if the total number of knowns is at least as great as the total number of variables, giving the condition for solvability as:

$$3N_A + N_M \times [N_A + (N_M - 1)] \geq 3(N_A + N_M)$$

$$N_M \times [N_A + (N_M - 1)] \geq 3N_M$$

$$N_A + N_M \geq 4$$

As in this example, with $N_A = 2$, $N_M = 2$.

This means that the number of measurements and equations grows rapidly as the number of modems involved increases, giving the ability to robustly estimate the position. If there are more measurements than unknowns, then this improves the accuracy of the position estimation. However, it is noted that, even though the equations can be solved, there may still be ambiguities in the position estimation.

Geometrical Constraints

Figure 18:
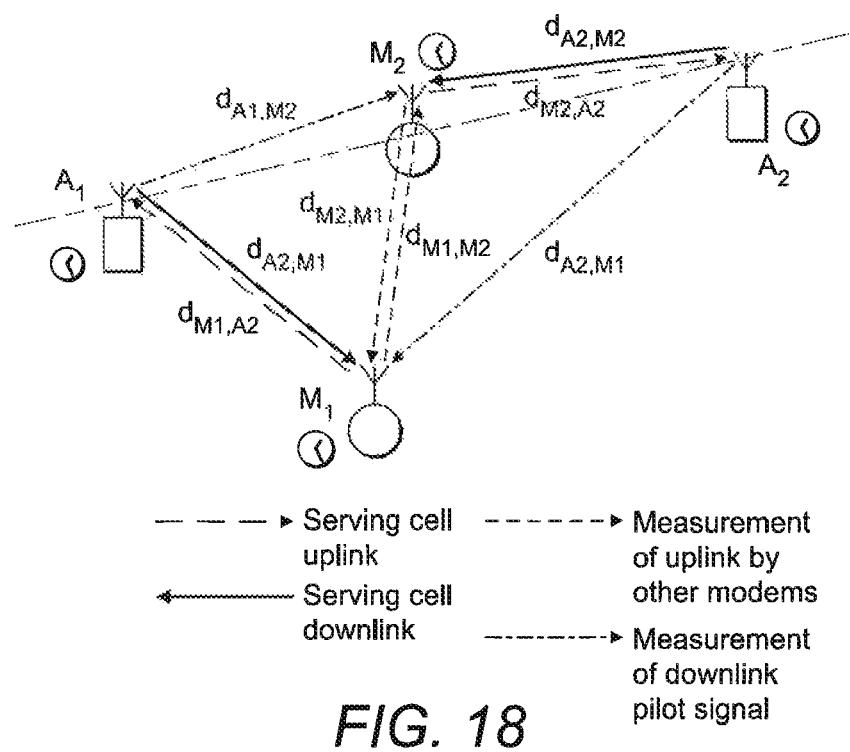
FIG. 18 shows the mirror image ambiguous solution for the case of FIG. 17.

In order to be able to solve the absolute position and orientation of the set of unknown modem locations, there must be at least two base stations observed, in known locations, and there must in addition be some other location information to resolve ambiguity. This is illustrated, for the minimal case analysed in FIG. 17, by way of contrast in FIG. 18.

The solution in this case has the modem locations reflected in the line of symmetry of the two base stations. If there is no additional information about the locations of the modems (for example based on other approximate knowledge or estimates, possibly from cell ID observations, or from past history), then signals from a third base station can be used to resolve which of the two possible solutions is the true one (the configuration in FIG. 17, or its reflection in FIG. 18).

The geometry of the arrangement of base stations and modems should preferably also be favourable, in order to avoid large uncertainties. For example, if the modems are close to each other, and are far from the base stations, then the separation between the modems will not be sufficient to provide clearly distinct measurements to the base stations from the two modem positions, and a large uncertainty in location will result. Again, in this case, a third base station can assist in the general location of the modems, with their fine separation measured by means of the measurements between them.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. A wireless communication device, comprising:
a receiver configured to intercept an uplink signal transmitted from a User Equipment (UE) to a base station serving the UE; and
a processor configured to:
obtain assistance information related to the uplink signal;
control the receiver to intercept the uplink signal based on the assistance information;
measure a time of arrival of the uplink signal at the receiver; and
perform an operation of:
using the measured time of arrival of the uplink signal to determine a position of the UE or a local time at the UE; or
sending the measured time of arrival of the uplink signal to a remote server for the remote server to determine the position of the UE or the local time at the UE,
wherein obtaining the assistance information comprises obtaining a first portion of the assistance information from a remote supporting service or the UE, and
using the first portion of the assistance information to obtain a second portion of the assistance information from a downlink signal transmitted from the base station.

2. The wireless communication device of claim 1, wherein the uplink signal is a first uplink signal, the UE is a first UE, the base station is a first base station, the receiver is a first receiver, and the wireless communication device is a second UE and further comprises:
a transmitter configured to transmit a second uplink signal to a second base station serving the second UE; and
a second receiver configured to receive a downlink signal from the second base station.

3. The wireless communication device of claim 1, wherein:
the processor is configured to obtain the assistance information from at least one of a remote supporting service or the UE, and
the assistance information comprises at least one of:
identity information of the UE;
the position of the UE;
first parameters of the uplink signal;
second parameters of the uplink signal that are specific to the UE;
third parameters of a downlink signal transmitted from the base station to the UE; and
information relevant to configuration of the UE, wherein the information is sent from the base station in the downlink signal.

4. The wireless communication device of claim 1, further comprising:
a second receiver configured to receive the downlink signal transmitted from the base station.

5. The wireless communication device of claim 4, wherein the processor is further configured to:
measure a time of arrival of the downlink signal at the second receiver; and
perform an operation of:
using the measured time of arrival of the downlink signal and the measured time of arrival of the uplink signal to compute the position of the UE or the local time at the UE; or
sending the measured time of arrival of the downlink signal and the measured time of arrival of the uplink signal to the remote server for the remote server to compute the position of the UE or the local time at the UE.

6. The wireless communication device of claim 4, wherein the processor is configured to obtain the second portion of the assistance information by decoding the downlink signal received from the base station.

7. The wireless communication device of claim 1, wherein the processor is configured to control the receiver to intercept the uplink signal in response to an instruction received from a source external to the wireless communication device.

8. The wireless communication device of claim 1, wherein the wireless communication device is configured to send a request to the UE or to a remote supporting service, to cause the UE to transmit the uplink signal to the base station.

9. The wireless communication device of claim 1, wherein the processor is further configured to:
obtain, after the uplink signal is intercepted, timing information including a time of transmission of the uplink signal by the UE; and
perform an operation of:
using the obtained timing information to compute the position of the UE or the local time at the UE; or
sending the obtained timing information to the remote server for the remote server to compute the position of the UE or the local time at the UE.

10. The wireless communication device of claim 2, wherein:
the first receiver and the second receiver are provided by a common receiver, and
the processor is configured to control the common receiver to disconnect from the downlink signal before intercepting the uplink signal.

11. The wireless communication device of claim 1, further comprising:
a Global Navigation Satellite System (GNSS) receiver configured to send GNSS positioning data to the remote server.

12. A server, comprising:
a memory;
a network interface configured to:
receive, from one or more wireless communication devices, times of arrival of uplink signals at the one or more wireless communication devices, wherein the uplink signals are transmitted from one or more UEs to respective one or more serving base stations and intercepted by the one or more wireless communication devices; and
receive assistance information related to the uplink signals; and a processor configured to:
  use the times of arrival of uplink signals and the assistance information to determine at least one of:
    positions of the one or more UEs or positions of the one or more wireless communication devices; or
    local times at the one or more UEs or local times at the one or more wireless communication devices,
  wherein the assistance information received by the server comprises a first portion of the assistance information from a remote supporting service or the one or more UEs, and a second portion of the assistance information from one or more downlink signals transmitted from the one or more serving base stations.

13. The server of claim 12, wherein the processor is further configured to obtain times of transmission of the uplink signals from reports sent by the one or more UEs.

14. A method for determining a position or a time, the method comprising:
  obtaining assistance information related to an uplink signal to be transmitted from a UE to a base station serving the UE;
  intercepting the uplink signal at one or more wireless communication devices based on the assistance information;
  measuring times of arrival of the uplink signal at the one or more wireless communication devices; and
  storing the measured times of arrival for computing at least one of: a position of the UE, positions of the one or more wireless communication devices, a local time at the UE, or local times at the one or more wireless communication devices,
  wherein obtaining the assistance information comprises obtaining a first portion of the assistance information from a remote supporting service or the UE, and
  using the first portion of the assistance information to obtain a second portion of the assistance information from a downlink signal transmitted from the base station.

15. A non-transitory computer-readable medium storing instructions that are executable by one or more processors of an apparatus to perform a method, the method comprising:
  obtaining assistance information related to an uplink signal to be transmitted from a UE to a base station serving the UE;
  intercepting the uplink signal based on the assistance information;
  measuring times of arrival of the uplink signal at the apparatus; and
  storing the measured times of arrival for computing at least one of: a position of the UE, a position of the apparatus, a local time at the UE, or a local time at the apparatus,
  wherein obtaining the assistance information comprises obtaining a first portion of the assistance information from a remote supporting service or the UE, and
  using the first portion of the assistance information to obtain a second portion of the assistance information from a downlink signal transmitted from the base station.

* * * * *